United States Patent
Van Pelt et al.

(10) Patent No.: US 11,087,247 B2
(45) Date of Patent: Aug. 10, 2021

(54) DYNAMIC OPTIMIZATION FOR DATA QUALITY CONTROL IN CROWD SOURCING TASKS TO CROWD LABOR

(75) Inventors: Christopher R. Van Pelt, San Francisco, CA (US); Ryan Cox, Oakland, CA (US); Alexander Sorokin, Foster City, CA (US)

(73) Assignee: Figure Eight Technologies, Inc., Kirkland, WA (US)

( * ) Notice: Subject to any disclaimer, the term of this patent is extended or adjusted under 35 U.S.C. 154(b) by 0 days.

(21) Appl. No.: 13/428,708

(22) Filed: Mar. 23, 2012

(65) Prior Publication Data

US 2012/0265573 A1    Oct. 18, 2012

Related U.S. Application Data

(60) Provisional application No. 61/466,540, filed on Mar. 23, 2011.

(51) Int. Cl.
  *G06Q 10/06* (2012.01)
(52) U.S. Cl.
  CPC ............... *G06Q 10/06311* (2013.01); *G06Q 10/063114* (2013.01)
(58) Field of Classification Search
  None
  See application file for complete search history.

(56) References Cited

U.S. PATENT DOCUMENTS

| | | |
|---|---|---|
| 3,417,916 A | 12/1968 | Rudolf et al. |
| 6,248,715 B1 | 6/2001 | Rosenberg et al. |
| 6,249,715 B1 * | 6/2001 | Yuri et al. ............ 700/111 |
| 6,859,523 B1 | 2/2005 | Jilk et al. |
| 6,938,048 B1 | 8/2005 | Jilk et al. |
| 7,082,426 B2 | 7/2006 | Musgrove et al. |
| 7,155,400 B1 | 12/2006 | Jilk et al. |
| 7,197,459 B1 | 3/2007 | Harinarayan et al. |
| 7,272,575 B2 | 9/2007 | Vega |
| 7,395,536 B2 | 7/2008 | Vernik et al. |

(Continued)

FOREIGN PATENT DOCUMENTS

| | | | |
|---|---|---|---|
| JP | 2003084818 A | 3/2003 | |
| JP | 2003265863 A | 9/2003 | |

(Continued)

OTHER PUBLICATIONS

Chen et al., "A Crowdsourceable QoE Evaluation Framework for Multimedia Content," MM'09, Oct. 19-24, 2009, Beijing, China, pp. 491-500.

(Continued)

*Primary Examiner* — Alan Torrico-Lopez
(74) *Attorney, Agent, or Firm* — Perkins Coie LLP

(57) ABSTRACT

Systems and methods of dynamic optimization for data quality control in crowd sourcing tasks to crowd labor are disclosed. In one aspect, embodiments of the present disclosure include a method, which may be implemented on a system, for dynamically monitoring results received from workers for a task distributed for evaluation via a job distribution platform, incrementally assigning additional workers to the task using the results and continuously monitoring additional results to assign any additional workers if needed to meet a quality metric for the task.

20 Claims, 13 Drawing Sheets

(56) References Cited

U.S. PATENT DOCUMENTS

| | | |
|---|---|---|
| 7,778,865 B1 | 8/2010 | Kane |
| 7,801,756 B1 | 9/2010 | Harinarayan et al. |
| 7,885,844 B1 | 2/2011 | Cohen et al. |
| 7,899,694 B1 | 3/2011 | Marshall et al. |
| 7,903,783 B2 | 3/2011 | Le et al. |
| 7,904,323 B2 | 3/2011 | Wynn et al. |
| 7,908,313 B2 | 3/2011 | Lurie et al. |
| 7,945,470 B1 | 5/2011 | Cohen et al. |
| 7,975,026 B2 | 7/2011 | Oh et al. |
| 8,099,311 B2 | 1/2012 | La Vecchia et al. |
| 8,121,879 B1 | 2/2012 | Cohen |
| 8,170,897 B1 | 5/2012 | Cohen et al. |
| 8,172,687 B2 | 5/2012 | Gagner et al. |
| 8,255,258 B1 | 8/2012 | Cohen et al. |
| 8,275,803 B2 | 9/2012 | Brown et al. |
| 8,285,196 B2 | 10/2012 | Rao |
| 8,295,196 B2 | 10/2012 | Ergen et al. |
| 8,315,894 B2 | 11/2012 | Naveh et al. |
| 8,407,073 B2 | 3/2013 | Bagheri et al. |
| 8,429,088 B2 | 4/2013 | Kaplan et al. |
| 8,452,629 B2 | 5/2013 | Chaar et al. |
| 8,554,605 B2 | 10/2013 | Le et al. |
| 8,694,577 B2 | 4/2014 | D'Angelo et al. |
| 8,825,523 B2 | 9/2014 | Gillenson et al. |
| 2002/0069079 A1 | 6/2002 | Vega |
| 2002/0132656 A1 | 9/2002 | Lydon et al. |
| 2003/0050829 A1 | 3/2003 | Dietz et al. |
| 2004/0098447 A1 | 5/2004 | Verbeke et al. |
| 2004/0143600 A1 | 7/2004 | Musgrove et al. |
| 2004/0261013 A1 | 12/2004 | Wynn et al. |
| 2005/0015501 A1 | 1/2005 | Kaplan et al. |
| 2005/0154600 A1 | 7/2005 | Feygenson et al. |
| 2005/0216331 A1 | 9/2005 | Ahrens et al. |
| 2006/0059490 A1 | 3/2006 | Knapp et al. |
| 2007/0124363 A1 | 5/2007 | Lurie et al. |
| 2008/0021755 A1 | 1/2008 | Jones et al. |
| 2008/0119134 A1 | 5/2008 | Rao |
| 2008/0133270 A1* | 6/2008 | Michelson et al. ............... 705/2 |
| 2008/0209431 A1 | 8/2008 | La Vecchia et al. |
| 2009/0070412 A1 | 3/2009 | D"Angelo et al. |
| 2009/0210282 A1* | 8/2009 | Elenbaas et al. ................. 705/9 |
| 2009/0231134 A1 | 9/2009 | Modica et al. |
| 2009/0234686 A1 | 9/2009 | Chakra et al. |
| 2010/0010860 A1 | 1/2010 | Bose et al. |
| 2010/0017252 A1 | 1/2010 | Chaar et al. |
| 2010/0057518 A1* | 3/2010 | Naveh et al. ..................... 705/9 |
| 2010/0069148 A1 | 3/2010 | Cargill |
| 2010/0095268 A1 | 4/2010 | Lowry et al. |
| 2010/0144446 A1 | 6/2010 | Oh |
| 2010/0250359 A1 | 9/2010 | Gillenson et al. |
| 2010/0293026 A1 | 11/2010 | Vojnovic et al. |
| 2010/0312605 A1 | 12/2010 | Mitchell et al. |
| 2010/0317442 A1 | 12/2010 | Thomas et al. |
| 2011/0066556 A1 | 3/2011 | Kadosh |
| 2011/0112880 A1* | 5/2011 | Ryan et al. .................. 705/7.16 |
| 2011/0145156 A1 | 6/2011 | Feng et al. |
| 2011/0252121 A1* | 10/2011 | Borgs et al. .................. 709/223 |
| 2011/0282793 A1 | 11/2011 | Mercuri et al. |
| 2011/0302003 A1 | 12/2011 | Shirish et al. |
| 2011/0307495 A1 | 12/2011 | Shoshan |
| 2011/0313801 A1* | 12/2011 | Biewald et al. ............. 705/7.12 |
| 2011/0313820 A1 | 12/2011 | Biewald et al. |
| 2011/0313933 A1* | 12/2011 | Dai .................. G06Q 10/10 705/301 |
| 2012/0029963 A1 | 2/2012 | Olding et al. |
| 2012/0029978 A1* | 2/2012 | Olding et al. ............... 705/7.42 |
| 2012/0053977 A1* | 3/2012 | Bagheri et al. ............. 705/7.14 |
| 2012/0072268 A1* | 3/2012 | Ritter et al. ................. 705/7.39 |
| 2012/0150579 A1* | 6/2012 | de Wit ........................ 705/7.14 |
| 2013/0006717 A1 | 1/2013 | Oleson et al. |
| 2013/0110590 A1 | 5/2013 | Folk et al. |
| 2013/0231969 A1 | 9/2013 | Van Pelt et al. |
| 2014/0039985 A1 | 2/2014 | Oleson et al. |
| 2014/0122188 A1 | 5/2014 | Van Pelt et al. |

FOREIGN PATENT DOCUMENTS

| | | |
|---|---|---|
| JP | 2004192061 A | 7/2004 |
| JP | 2007047926 A | 2/2007 |
| JP | 2007141039 A | 6/2007 |
| JP | 2008017946 A | 1/2008 |
| KR | 20040053864 A | 6/2004 |
| KR | 20060122236 A | 11/2006 |
| WO | 2008102255 A1 | 8/2008 |
| WO | WO-2008102255 | 8/2008 |

OTHER PUBLICATIONS

Hinds, et al., "Structures that Work: Social Structure, Work Structure and Coordination Ease in Geographically Distributed Teams" CSCW'06, Nov. 4-8, 2006, Banff, Alberta, Canada, pp. 343-352.
International Search Report and Written Opinion for PCT/US2011/037626; Date of filing of Application: May 24, 2011; dated Jan. 17, 2012; 10 pages.
Stross, Randall, "When the Assembly Line Moves Online," The New York Times.com, Oct. 30, 2010, 4 pages.
Torikka, Mikko, "Crowdsourcing Startup Microtask Gets Gamers to Do Some Real Work," VentureBeat.com, Mar. 22, 2011, 7 pages.
International Search Report and Written Opinion for PCT/US2011/037625; Date of filing of Application: May 23, 2011; dated Jan. 19, 2012; 10 pages.
Ipeirotis et al., "Quality Management on Amazon Mechanical Turk," 2010 ACM 978-1-4503-0222-7, pp. 64-67.
Florian Alt. et al., "Location-based Crowdsourcing: Extending Crowdsourcing to the Real World," NordiCHI 2010, Oct. 16-20 2010, Reykjavik, Iceland, 10 pages.
U.S. Appl. No. 12/817,946, filed Jun. 17, 2010, Distributing a Task to Multiple Workers over a Network for Completion while Providing Quality Control.
U.S. Appl. No. 12/817,979, filed Jun. 17, 2010, Using Virtual Currency to Compensate Workers in a Crowdsourced Task.
U.S. Appl. No. 61/466,540, filed Mar. 23, 2011, Feedback System and Method for Quality Control and Cost Management in Crowdsourcing.
U.S. Appl. No. 13/275,284, filed Oct. 17, 2011, Performance Data in a Worker Profile Aggregated by a Job Distribution Platform for Workers That Perform Crowd Sourced Tasks.
U.S. Appl. No. 61/502,815, filed Jun. 29, 2011, Programmatic Gold Targeted and Scalable Quality Assurance in Crowdsourcing.
U.S. Appl. No. 61/503,483, filed Jun. 30, 2011, Programmatic Gold: Targeted and Scalable Quality Assurance in Crowdsourcing.
U.S. Appl. No. 13/275,290, filed Oct. 17, 2011, Evaluating a Worker in Performing Crowd Sourced Tasks and Providing In-Task Training Through Programmatically Generated Test Tasks.
U.S. Appl. No. 61/605,650, filed Mar. 1, 2012, Adaptive Workflow Definition of Crowd Sourced Tasks and Quality Control Mechanisms for Multiple Business Applications.
U.S. Appl. No. 61/607,985, filed Mar. 7, 2012, Adaptive Workflow Definition of Crowd Sourced Tasks and Quality Control Mechanisms For Multiple Business Applications.
U.S. Appl. No. 13/782,917, filed Mar. 1, 2013, Adaptive Workflow Definition of Crowd Sourced Tasks and Quality Control Mechanisms For Multiple Business Applications.
International Search Report and Written Opinion for PCT/US2012/045321; Date of filing of Application: Jul. 2, 2012; dated Jan. 10, 2013; 10 pages.
International Search Report and Written Opinion for PCT/US2012/060659; Date of filing of Application: Oct. 17, 2012; dated Mar. 28, 2013; 12 pages.
Active Learning for Natural Language Processing NAACL, ISBN 978-1-932432-40-4, Onipress Inc, Jun. 5, 2009, 73 pages.
Alonso et al., "Crowdsourcing for Relevance Evaluation," ACM, V42, N2, Dec. 2008, 7 pages.
Crowdflower Business Listing Verification, YouTube webpages, Jun. 29, 2011, http://www.youtube.com/watch?v=68qd5e4JTpY, 1 page.
Crowdflower, Youtube webpages, uploaded Mar. 30, 2010, http://www.youtube.com/watch?v=U4O8RYtcGc4, 4 pages.

(56) References Cited

OTHER PUBLICATIONS

Dawid et al., Maximum Likelihood Estimation of Observer Error-Rates Using the EM Algorithm, Journal of Royal Statistical Society Series C, V28, N1, Jan. 1, 1979, pp. 20-28.

Dredze Mark, Annotating Named Entities in Twitter Data with Crowdsourcing, Proceedings of the NAACL HL T, pp. 80-88, Jun. 2010.

Eckert et al., "Crowdsourcing the Assembly of Concept Hierarchies," ACM 978-1-4503-0085, Jun. 25, 2010, 10 pages.

Kazai Gabriella, "An Exploration of the Influence that Task Parameters have on the Performance of Crowds," Microsoft, Oct. 4, 2010, http://www.crowdconf2010.com/images/finalpapers/kazai/pdf, 9 pages.

Kern et al., "Statistical Quality Control for Human-Based Electronic Services," ICSOC 2010, LNCS 6470, pp. 243-257, Springer, Dec. 7-10, 2010, 10 pages.

Merge et al., "Using the Amazon Mechanical Turk for Transcription of Spoken Language," Carnegie Mellon University, Jan. 1, 2010, 5 pages.

Oleson et al., "Programmatic Gold-Targeted and Scalable Quality Assurance in Crowdsourcing," AAAI Workshop, Aug. 7-8, 2011, pp. 43-48.

Sheng et al., "Get another label-Improving data quality and data mining multiple," noisy labelers KDD Aug. 24-27, 2008, 9 pages.

Smucker et al, "The Crowd vs the Lab—A comparison of crowd-sourced and University Laboratory Participant Behavior," SIGIR 2011, Jul. 2011, 6 pages.

Le et al., "Ensuring quality in crowdsourced search relevance evaluation—the effects of training question distribution," SIGIR 10, Jul. 19-23, 2010, 4 pages.

Munro, "Crowdsourcing and language studies—the new generation of linguistic data," Los Angeles, CA, NAACL HLT, Jun. 6, 2010, 6 pages.

U.S. Appl. No. 12/817,946, filed Jun. 17, 2010, titled Distributing a Task to Multiple Workers Over a Network For Completion While Providing Quality Control.

U.S. Appl. No. 12/817,979, filed Jun. 17, 2010, titled Using Virtual Currency to Compensate Workers in a Crowdsourced Task.

U.S. Appl. No. 61/466,540, filed Mar. 23, 2011, titled Feedback System and Method For Quality Control and Cost Management in Crowdsourcing.

U.S. Appl. No. 13/275,284, filed Oct. 17, 2011, titled Performance Data in a Worker Profile Aggregated By a Job Distribution Platform for Workers That Perform Crowd Spurced Tasks.

U.S. Appl. No. 61/502,815, filed Jun. 29, 2011, titled Programmatic Gold Targeted and Scalable Quality Assurance in Crowdsourcing.

U.S. Appl. No. 61/503,483, filed Jun. 30, 2011, titled Programmatic Gold: Targeted and Scalable Quality Assurance in Crowdsourcing.

U.S. Appl. No. 13/275,290, filed Oct. 17, 2011, titled Evaluating a Worker in Performing Crowd Sourced Tasks and Providing In-Task Timing Through Programmatically Generated Test Tasks.

U.S. Appl. No. 14/048,342, filed Oct. 8, 2013, titled Evaluating a Worker in Performing Crowd Sourced Tasks and Providing In-Task Training Through Programmatically Generated Test Tasks.

U.S. Appl. No. 61/605,650, filed Mar. 1, 2012, titled Adaptive Workflow Definition of Crowd Sourced Tasks and Quality Control Mechanisms for Multiple Business Applications.

U.S. Appl. No. 61/607,985, filed Mar. 7, 2012, titled Adaptive Workflow Definition of Crowd Sourced Tasks and Quality Control Mechanisms for Multiple Business Applications.

U.S. Appl. No. 13/782,917, filed Mar. 1, 2013, titled Adaptive Workflow Definition of Crowd Sourced Tasks and Quality Control Mechanisms For Multiple Business Applications.

Munro et al., "Crowdsourcing and Language Studies; the New Generation of Linguistic Data," CSLDAMT '10 Proceedings of the NAACL HLT 2010 Workshop on Creating Speech and Language Data with Amazon's Mechanical Turk; Association for Computational Liguistics, Stroudsburg, PA, 2010, 12 pages.

Notice from the European Patent Office dated Oct. 1, 2007 concerning business methods.

"Crowd Flower Bolsters a New Era of Work", PRWeb, Sep. 15, 2009 (Year: 2009), Sep. 15, 2009.

Cutler, Kim-Mai, "TC50: Crowd Flower offers rich analytics for Mechanical Turks", Venturebeat.com, Sep. 15, 2009 (Year: 2009).

Eagle, Nathan, "txteagle: Mobile Crowdsourcing", Internationalization, Design and Global Development, LNCS, 2009 (Year: 2009).

Finin, Tim, et al., "Annotating Named Entities in Twitter Data with Crowdsourcing", Proceedings of the NAACL HLT, pp. 80-88, Jun. 2010 http://ebiquity.umbc.edu/_file_directory_/papers/483.pdf http://dl.acm.org/citation.cfm?id=1866709.

Howe, Jeff, "The Rise of Crowdsourcing", Wired, Jun. 2006 (Year: 2006).

Kittur, Aniket, et al., "Crowdsourcing User Studies With Mechanical Turk", CHI 2008 Proceedings, ACM, Apr. 5-10, 2008 (Year: 2008).

Leymann, F., et al., "Workflow-based applications", Nov. 1997, IBM IBM Systems Journal, vol. 36 (Year: 1997), 102-123.

Lorcia, Ben, "Mechincal Turk app on the iPhone provides Work for Refugees", Oreilly.com, Oct. 13, 2009 (Year: 2009).

Mahajan, Neelima, "Labor-on-Demand, Crowd Flower Gets Garners to Do Real Work for Virtual Pay", Mission Local, Nov. 5, 2010 (Year: 2010).

Oleson, David, et al., "Programmatic Gold-Targeted and Scalable Quality Assurance in Crowdsourcing", AAAI Workshop 2011, pp. 43-48.

Salas, Oscar Figueroia, et al., "Assessing Internet Video Quality Using Crowdsourcing", ACM Conference 10, 2010 (Year: 2010), 2010.

Schmidt, Lauren, "Crowdsourcing for Human Subjects Research", CrowdConf 2010, San Francisco Oct. 4, 2010 http://www.crowdsourcing.org/document/crowdsourcing-for-human-subjects-research/3002.

\* cited by examiner

DYNAMIC OPTIMIZATION FOR DATA QUALITY CONTROL IN CROWD SOURCING TASKS TO CROWD LABOR

CROSS-REFERENCES TO RELATED APPLICATIONS

This application claims the benefit of U.S. Provisional Application No. 61/466,540 filed Mar. 23, 2011 and entitled "FEEDBACK SYSTEM AND METHOD FOR QUALITY CONTROL AND COST MANAGEMENT IN CROWDSOURCING," the contents of which are incorporated by reference in its entirety.

This application is related to, and incorporates by reference, U.S. application Ser. No. 12/817,946 filed Jun. 17, 2010 and entitled "DISTRIBUTING A TASK TO MULTIPLE WORKERS OVER A NETWORK FOR COMPLETION WHILE PROVIDING QUALITY CONTROL," and U.S. application Ser. No. 12/817,979 filed Jun. 17, 2010 and entitled "USING VIRTUAL CURRENCY TO COMPENSATE WORKERS IN A CROWDSOURCED TASK."

This application is related to, and incorporates by reference, U.S. application Ser. No. 13/275,284 filed Oct. 17, 2011 and entitled "PERFORMANCE DATA IN A WORKER PROFILE AGGREGATED BY A JOB DISTRIBUTION PLATFORM FOR WORKERS THAT PERFORM CROWD SOURCED TASKS."

This application is related to, and incorporates by reference, U.S. application Ser. No. 13/275,290 filed Oct. 17, 2011 and entitled "EVALUATING A WORKER IN PERFORMING CROWD SOURCED TASKS AND PROVIDING IN-TASK TRAINING THROUGH PROGRAMMATICALLY GENERATED TEST TASKS."

TECHNICAL FIELD

The disclosed technology relates generally to providing scalable and cost effective mechanisms for providing dynamically optimized quality control in crowdsourcing.

BACKGROUND

Outsourcing mundane tasks and jobs to online labor around the globe has demonstrated potential in assisting entities and individuals complete a large amount of tasks in a time efficient manner. However, given the variability in labor pool, education level, age group, the results of the completed tasks are frequently less than ideal. Although entities could utilize crowd sourcing to have tasks completed in a short amount of time for a reasonable cost, the quality is typically highly variable and frequently unreliable.

Crowd sourcing is a growing industry, and online platforms exist for completion of tasks and microtasks. Labor-on-demand platforms provide APIs for application development and an international payment infrastructure for the deployment and implementation of crowd sourced tasks. Crowd sourcing has become a global phenomenon with a low barrier to entry. Millions of people around the world now participate in a digital and virtual workplace. However, the breadth and diversity among crowd sourcing participants, workers and researchers is immense and poses a challenge to implement adequate quality control mechanisms to account for a wide range of worker behavior: scammers, lazy workers, ethical workers, unethical workers, slow learners, etc. in a resource effective and adaptive manner.

DETAILED DESCRIPTION

Figure 1:
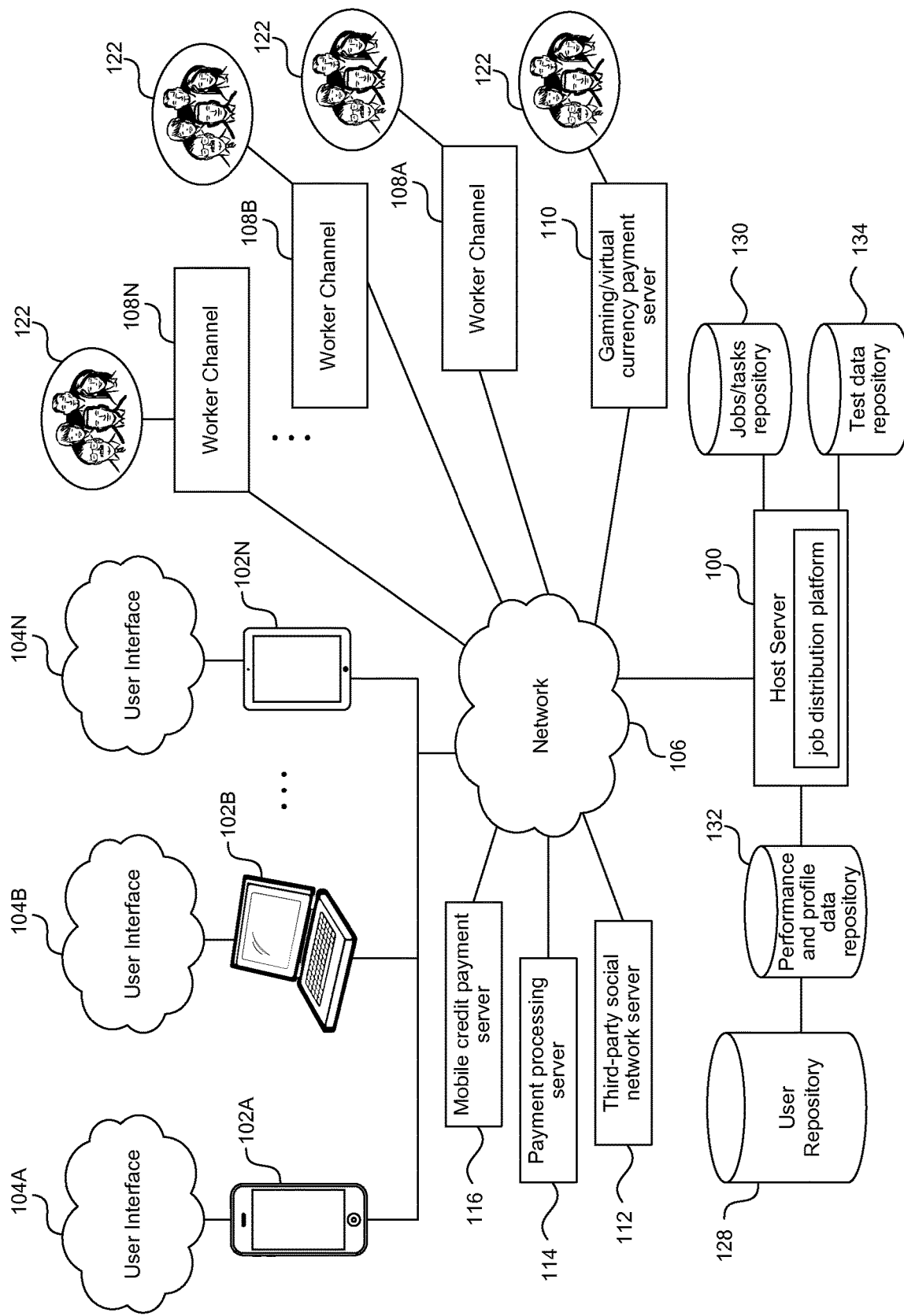
FIG. 1 illustrates an example block diagram of a host server of a job distribution platform that performs crowd sourcing by distributing tasks over a network to multiple workers and is able to dynamically optimize data quality control in the crowd sourcing.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used tor any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for dynamic optimization for data quality control in crowd sourcing tasks to crowd labor.

FIG. 1 illustrates an example block diagram of a host server 100 of a job distribution platform that performs crowd sourcing by distributing tasks over a network 106 to multiple workers 122 and is able to dynamically optimize data quality control in the crowd sourcing.

The client devices 102A-N can be any system and/or device, and/or any combination of devices/systems that is able to establish a connection with another device, a server and/or other systems. Client devices 102A-N each typically includes a display and/or other output functionalities to present information and data exchanged between among the devices 102A-N and the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

The client devices 102A-N, worker channels 108, workers (or contributors) 122, gaming server 110, third party social network server 112, payment processing server 114, and/or mobile credit payment server 116, can be coupled to a network 106. In some embodiments, the devices 102A-Nand host server 100 may be directly connected to one another.

In one embodiment, the host server 100 is operable to perform crowd sourcing services and/or to process crowd sourcing requests for entities (e.g., companies, organizations or other types of institutions) or users (e.g., individual or groups of users via devices 102A-N. Workers (e.g., users or contributors) can access their jobs or assigned/distributed tasks via their own devices 102A-N, networked to the host server 100. The host server 100 can distribute a task to be crowd sourced to multiple workers (who may be located through various different channels 108A-N) and provide sophisticated quality control and cost management mechanisms, including tracking worker data over a period of time to provide an indication of worker preference, level of expertise, responsiveness, value of work, performance, speed, and other like performance/quality metrics for the worker or the generated work product.

In one embodiment, the host server 100 is further able to evaluate a workers work quality, reliability in performing crowd sourced tasks via their own user devices 102A-N by intelligently generating evaluation or test tasks with known right answers or known false answers to be presented to a worker or potential worker (e.g., new worker being initially assessed for competency and usability) to see if the worker provides the correct response. The evaluation or test tasks can be generated (e.g., automatically or semi-automatically) from jobs actually submitted to and distributed through the job distribution platform of the host server 100 for completion by workers/contributors such that no additional resources need to be utilized for creation and management of test tasks. Moreover, in-task training of workers/contributors can be automated through use of test/evaluation tasks. Test task/evaluation task generation and management are described with further references to the examples of FIG. 4.

The host server 100 is further able to dynamically optimize the system and task assignments for quality control to conserve labor resource and/or to manage cost, and is further described with references to the examples of FIGS. 5-11.

The host server 100 of the job distribution platform utilizes workers from multiple worker pools via different channels 108. The host server 100 can have a partnering relationship with one or more of the channels 108. Channels can be chosen by demographic requirements such as location and general age/sex of the worker pool. When a contributor completes the work required, the job distribution platform can inform the partner (or channel) that a transaction has completed for a specified amount. The partner can then award the contributor some percentage of the amount in either virtual or real currency. The access to multiple worker pools allows the job distribution platform access to a larger group of workers/contributors and enhances scalability and diversifies worker base. The worker pool which is used for a given job or task can be selected manually by the person posting the task and/or determined in part or in whole by the host server 100. Some pools have limitations, for example, some do not allow adult content, others do not provide the cultural or language needs of the task.

Quality control and the amount of quality desired can be configured by the requesting entity or user such that for example, a user or entity is only charged for the task if completed to the desired or target accuracy level. The channels 110 through which labor can be identified can include by way of example, but not limitation, Amazon Mechanical Turk, Give Work, SamaSource, Trial Pay (e.g., a virtual currency provider), third party social networks (e.g., Facebook, Twitter, LinkedIn, MySpace, third-party social network server 112) or gaming platforms (e.g., Gambit, Prodege, etc.) New and additional labor forces are constantly being integrated into the system and partnering with the host 100, each with their own advantages and disadvantages.

The host server 100, can in addition, also utilize social networks or social network servers (e.g., the 3rd party social network server 112) to aggregate, parse, and/or identify information such as preferences, likes/dislikes, language proficiency, general proficiency, interests, hobbies, expertise related information about workers or contributors which can be used in a worker profile and used as factors in selecting suitable workers for a given job or task.

In some instances, the host server 100 utilizes an online gaming service or platform (e.g., through a third-party gaming server 110 or other partnering platform) through which to distribute tasks or unit jobs and tasks. Gaming services which provide games to various types of online or web-based platforms can also be partnered with the host server 100 of the job distribution platform. Note that the host server 100 may also host gaming services via one or more gaming platforms. The unit jobs can be distributed to garners or other visitors on the gaming platform. In one embodiment, the workers utilized in an online game can be paid in virtual currency, such as virtual currency that can be used to play games on the gaining server 110.

In some instances, the host server 100 utilizes a payment processing server 114 to facilitate payment of workers or contributors 122 in money. The payment processing server 114 can be integrated or operated by the same entity as the host server 100 of the job distribution platform, or it may be operated by a third party. The host server 100 manages the payment preferences of a given worker and ensure, for example, through the payment processing server 114 that the worker gets paid in the desired currency e.g., U.S. dollars, Euro, etc.), at the desired frequency, in a desired channel (e.g., online, PayPal, direct bank account deposit, physical check, money order), in a desired format (e.g., money, mobile credits, gaming credits, or other types of virtual currency, etc.). For example, the host server 100 can also interact with a mobile credit payment service or mobile credit payment server 116 to facilitate the payment of workers or contributors with mobile credits. The mobile credit payment server 116 may be operated by a wireless network operator or another third party entity. In some instances, the host server 100 internally has mobile credit payment services which operates in whole or in part the payment/compensation of workers in mobile credits.

Functions and techniques performed by the host server 100 and the components therein are described in detail with further references to the examples of FIGS. 2A-B and FIGS. 4-5.

The client devices 102A-N are generally operated by entities/users requesting crowd sourcing services, for example via user interface 104A-N displayed on the display units. The client devices may also be. The client devices 102A-N may also be used (e.g., by programmers and developers) by workers to access job units or tasks for completion.

In one embodiment, client devices 102 communicate with the host server 100 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UNITS, HSPDA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128, a job/tasks repository 130, a performance and profile data repository 132, and/or a test data repository 134. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to provide data to be stored in the user repository 128, the tasks repository 130, performance/profile data repository 132, and/or test data repository 134 and/or can retrieve data stored in the repositories. The user repository 128 can store user (e.g., worker) information, statistics, speed, accuracy, topics of interest, topics of expertise, etc. The tasks repository 130 can include, tasks or unit jobs (e.g., in spreadsheets or other types of files) specified by entities or individuals requesting crowd sourcing services. The repository 130 can also include information about the requesting entities or individuals.

One embodiment further includes a performance and profile data repository 132 which can store enhanced worker (e.g., contributor) performance information and metrics, worker preference information, demographic profile information, social network information, peer review information, etc. Additional details of examples of types of data stored in the repository 132 as illustrated with further reference to the example of FIG. 3. One embodiment includes a test data repository 134, which can store generated test data or evaluation data used in assessing worker competency.

Figure 2A:
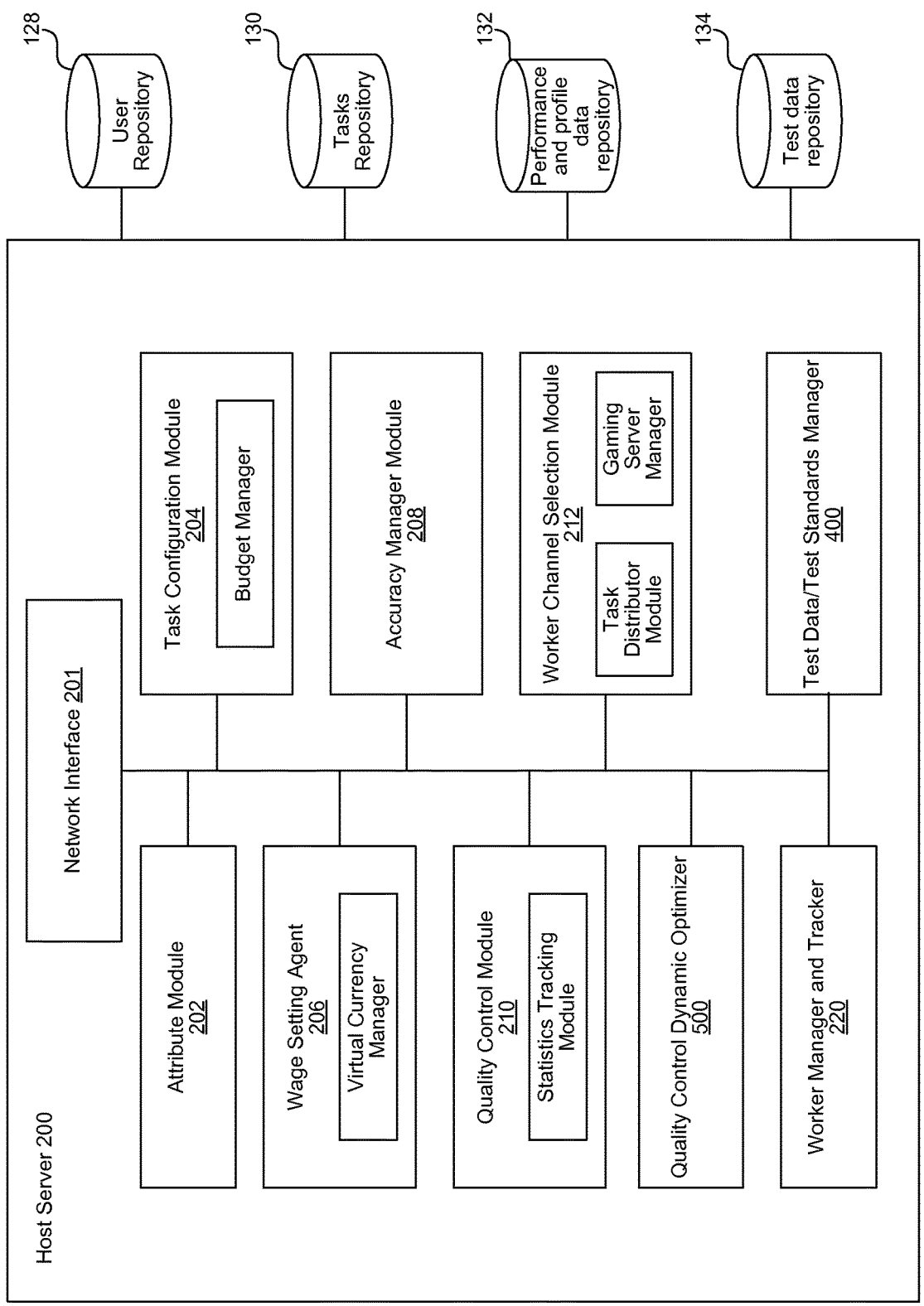
FIG. 2A depicts an example block diagram of the components of a host server of a job distribution platform that distributes (e.g., crowd sources) tasks or microtasks to workers online, provides enhanced quality control through use and aggregation of worker profile data, intelligent disseminates/generates test/evaluation tasks to evaluate worker quality and reliability. The host server is further able to dynamically optimize data quality control.

FIG. 2A depicts an example block diagram of the components of a host server 200 of a job distribution platform that distributes (e.g., crowd sources) tasks or microtasks to workers online, provides enhanced quality control through use and aggregation of worker profile data, intelligent disseminates/generation of test/evaluation tasks to evaluator evaluate worker quality and reliability. The host server is further able to dynamically optimize data quality control.

The host server 200 can include, for example, a network interface 201, an attribute module 202, a task configuration module 204 having a budget manager, a wage setting agent 206 having a virtual currency manager, an accuracy manager module 208, a quality control module 210 having a statistics tracking module, a worker channel selection module 212 having a task distributor module and/or a gaming server manager, a worker manager and tracker 220, test data/test standards manager 400, and/or a work flow generator and manager 500. Additional or less components/modules/engines can be included in the host server 200 and each illustrated component.

The network interface 201 can be a networking module that enables the host server 200 to mediate data in a network with an entity that is external to the host server 200, through any known and/or convenient communications protocol supported by the host and the external entity. The network interface 201 can include one or more of a network adaptor card, a wireless network interface card (e.g., SMS interface, WiFi interface, interfaces for various generations of mobile communication standards including but not limited to 1G, 2G, 3G, 3.5G, 4G, LTE, Bluetooth, a router, an access point, a wireless router, a switch, a multilayer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 200 includes an attribute module 202. The attribute module 202 can be any combination of software agents and/or hardware modules (e.g., including processors and/or memory units) able to identify, detect, extract, an attribute of a task, which generally includes multiple units.

An attribute of a task can include, by way of example hut not limitation, level of difficulty of the task, level of subjectivity, etc. Task attributes can be specified or measured by an amount of time that is needed to complete the task. In addition, the attribute can include determining target accuracy specified by the entity or user requesting the crowd sourcing services.

Task attributes can be determined during a calibration process when the requesting entity is setting up jobs or tasks to be distributed to on-demand labor for completion. Timing, wages, and target accuracy can be determined and computed for a unit job or task.

One embodiment of the host server 200 includes a task configuration module 204. The task configuration module 204 can be any combination of software agents and/or hardware modules (e.g., including processors and/or memory units) able to configure a task or unit jobs for quality control and based on a user's specified parameters.

For example, the task configuration module 204 allows the user to upload or edit tasks/unit jobs via a web interface. In addition, the task configuration module 204 calibrates a task by identifying its attributes or attributes of a single unit job. For example, the task configuration module 204 determines the amount of time needed a certain unit job or task requires. This information can be used to determine the wage to pay a worker when they have completed their jobs, for example, by the wage setting agent 206.

One embodiment of the host server 200 includes a wage setting agent 206. The wage setting agent 206 can be any combination of software agents and/or hardware modules (e.g., including processors and/or memory units) able to set a wage amount that is offered to a worker for completing a unit job of the task based on the attribute and the target accuracy.

In general, the wage setting agent 206 can set the wage based on one or more of the attributes, level of target accuracy, the requestor's budget, etc. In addition, the requesting entity/user can specify a desired level of wage to pay each worker. In one embodiment, the system sets the wage dynamically. For example, the initial calibration of the wage can be an estimate and the actual wage is calculated as the job progresses. The system can continue to track the amount of time/resources needed by workers to complete a job. This way, the system can compensate for jobs that are taking workers different amounts of time from what was originally estimated. For example, while most jobs end up around $x/hr, but jobs that are extremely time sensitive can be much higher (e.g., as much as 4-20x/hr). Were is also a direct correlation between quality of the work and payment amount. Using the wage amount, the agent 206 can also determine the total cost to the requesting entity to complete the task using the total number of job units in the task. The wage setting agent 206 is configured such that the requestor (entity or user) can tweak the total cost by adjusting, one or more of the target level of accuracy and the desired/ideal level of wage for paying the workers.

One embodiment of the host server 200 includes an accuracy manager module 208. The accuracy manager module 208 can be any combination of software agents and/or hardware modules (e.g., including processors and/or memory units) able to determine, set, identify, the target accuracy in completion of the task by the entity.

The target accuracy can be, for example, specified by the entity/user requesting that a task be distributed to multiple workers (e.g., including online labor, on-demand labor) for completion. The target accuracy can be specified during calibration. The user/entity and indicate whether more or less accuracy is desired. Generally more accurate results require additional results to be obtained per job unit, thus potentially increasing the total cost to complete the task. In some instances, the target accuracy may be set by default rather than user customized.

One embodiment of the host server 200 includes a quality control module 210. The quality control module 210 can be any combination of software agents and/or hardware modules (e.g., including processors and/or memory units) able to implement quality control mechanisms to ensure that the results of the completion of the task are of a quality expected by the requestor.

The quality control module 210 can compute the number of results (e.g., judgments) needed per job unit based on the target accuracy. To compute the number of results, in one embodiment, a minimum number of judgments is initially set. If the measure of agreement is below a predefined percentage once the minimum number of judgments has been collected, more judgments can be collected until the predefined agreement has been met. A maximum number of judgments can also be set, for example to ensure jobs run within budget.

In addition, the quality control module 210 can manage the standards for each task used for quality control. For example, the quality control module 210 enables the requesting entity/user to specify a select set of unit jobs that are presented to online labor units for the entity to evaluate quality of task completion. The questions can be added. In general, the types of tasks that are good for the quality control are those with a right or wrong answer.

For these questions, the correct answers or responses are typically specified. The user/entity can also monitor/track the efficacy of the selected questions. A user can see each selected question and whether workers have correctly answered these questions. The user can also see, access, and/or track how many workers have responded to a selected question. Using the statistics, the user can modify the selection accordingly.

Using these questions, the quality control module 210 can determine the quality of the work and the quality of a particular worker's work product. For example, the quality control module 210 may include a statistics tracking module which tracks, collects anchor aggregates statistics of the online labor units completing the select jobs. In most instances, workers are able to choose any job that has been assigned as long as they meet certain requirements (e.g., age and/or language, etc.). However, workers can also be prohibited from working on a single job, single type of job, or all jobs. For example, workers history, statistics, and performance, can be used to target jobs to workers based on what they have performed well on. Workers are typically allowed to attempt any job they have not been blocked from. If it is the first time they have seen the task they will only be asked known questions. If they have not answered a pre-defined number of questions correctly within a certain time period they are typically not allowed to perform the actual task.

One embodiment of the host server 200 includes a worker selection module 212. The worker selection module 212 can be any combination of software agents and/or hardware modules (e.g., including processors and/or memory units) able to select workers (e.g., online workers, on-demand labor, etc.) to whom to distribute unit jobs of a task.

The worker selection module 212 can select a channel based on the user/entity's selection (e.g., Mechanical Turk, Crowdflower, Gambit (e.g., a third party gaming platform). Give Work, SamaSource, Trial Pay (e.g., a virtual currency provider), Internal, etc. New and additional labor forces are constantly being integrated into the system, each with their own advantages and disadvantages. Based on the selected channel, the task distributor can then distribute jobs to various workers for completion of unit jobs in the task.

In one embodiment, the selected channel is an online gaming environment in which garners or other users are presented with unit jobs white playing games or doing something else. These users can be paid in virtual currency, for example, that they can use in the online gaming environment. Such a process can be performed by the gaming service manager. The gaming server manager can manage games internal to the host server 200 or manage communications with an external gaming server (e.g., the gaming server 110 shown in the example of FIG. 1). The tasks can be presented on a site hosted by the server 200 of presented to workers on the third party site.

In one embodiment, the gaming server manager in the worker channel selection module 212 communicates with the wage setting agent 206 to determine the wage that a worker/gamer would be entitled to upon completion of a unit job or task. The gaming server manager can then determine the amount of virtual currency to which the wage converts. The gaming server manager then communicates the tasks to be presented via the gaming site to the third pa gaming server.

One embodiment of the host server 200 includes a worker manager and tracker module 220. The worker channel selection module 212 can be any combination of software agents and/or hardware modules (e.g., including processors and/or memory units) able to detect, track, compute, generate, determine, and/or identify job performance data or job performance-related data tor multiple workers/contributors via the job distribution platform. Other types of worker information may also be tracked and generated for multiple workers in various worker pools (channels), for example, psych questions or other more subjective data collected from a worker or contributor in addition to performance.

Worker information including job performance data, can be tracked over a period of time (e.g., historical performance data) for a worker. For example, performance data can be tracked for a given task, a given job (a job can include multiple tasks), a session (e.g., a worker can work on multiple jobs and tasks during a given work session), a day, a week, a month, a year, etc. Useful statistical data can be generated or computed by the manager and tracker module 220 for the job distribution platform to more effectively and efficiently control quality of work product, extract/determine meaningful information about each individual worker/contributor, and/or allow jobs/projects to be more effectively cost managed. By tracking, aggregating, and storing performance data for multiple users across several worker pools, the job distribution platform can have access to useful information for distributing work and managing quality and cost.

Detailed features and functionalities of the worker manager and tracker module 220 are described with reference to FIG. 2B.

One embodiment of the host server 200 includes a test data/test standards manager 400. The test data/test standards manager 400 can be any combination of software agents and/or hardware modules (e.g., including processors and/or memory units) able to generate test data, test jobs, test or evaluation tasks to assess and evaluate worker competency, ability, and/or usability. Manager 400 can also use these test data/jobs or tasks to provide in-task training of workers as they are working on jobs distributed by the host 200. Detailed features and functionalities of the test data/test standards manager 400 are described with reference to FIG. 4.

One embodiment of the host server 200 includes a quality control dynamic optimizer 500. The quality control dynamic optimizer 500 can be any combination of software agents and/or hardware modules (e.g., including processors and/or memory units) able to dynamically optimize the system and task assignments for quality control to conserve labor resource and/or to manage cost. Detailed features and functionalities of the quality control dynamic optimizer 500 are described with reference to FIG. 5.

The host server 200 represents any one or a portion of the functions described for the modules. The host server 200 can include additional or less modules. More or less functions can be included, in whole or in part, without deviating from the novel art of the disclosure. The repositories 128, 130, and 132 were discussed in conjunction with the description of FIG. 1. The repository 132 is described with further reference to the example of FIG. 3.

Figure 2B:
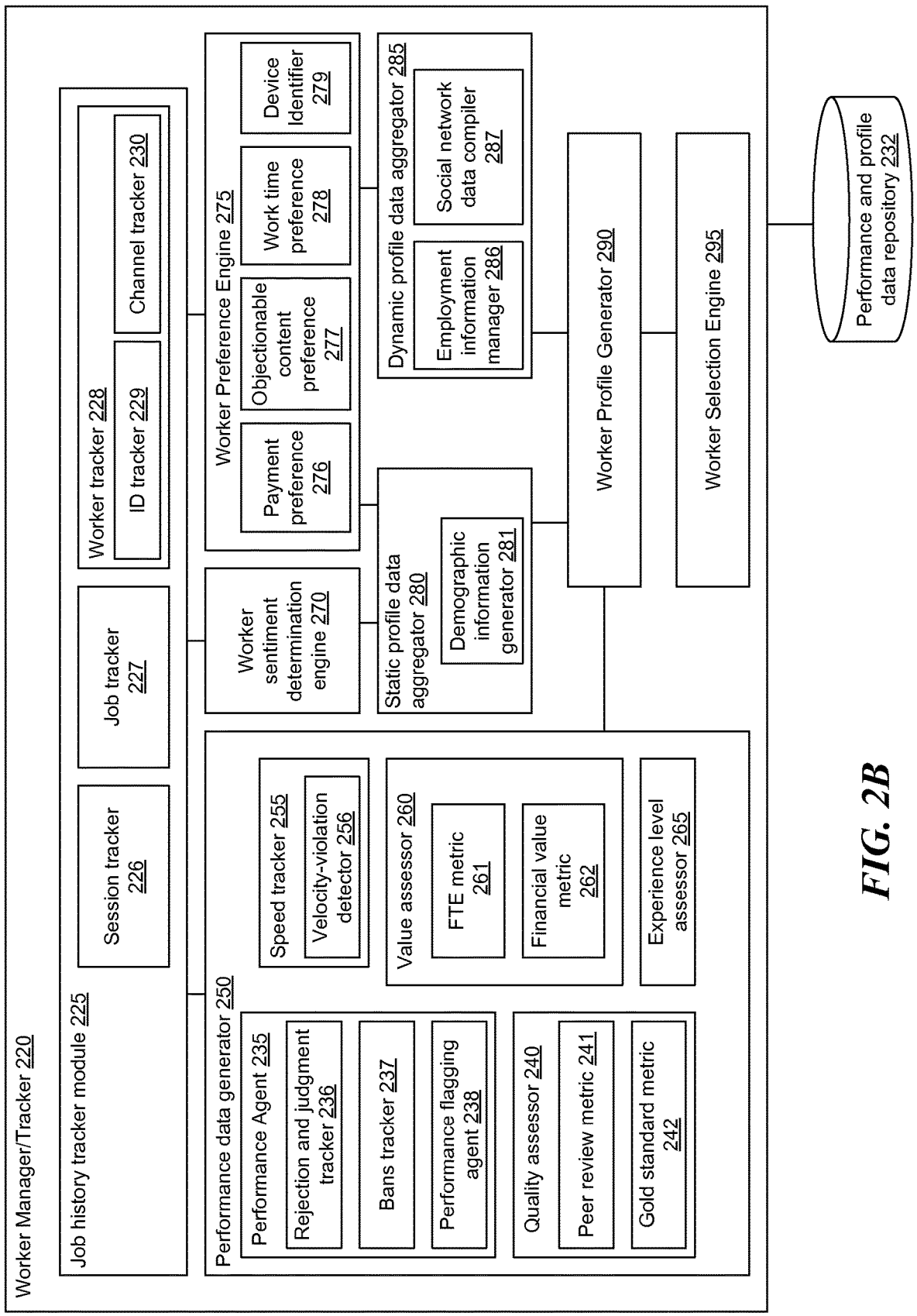
FIG. 2B depicts an example block diagram of the components of a worker manager/tracker module of the host server able to generate and store performance data when a worker performs tasks distributed to them by a job distribution platform which crowd sources tasks over a network to remote workers.

FIG. 2B depicts an example block diagram of the components of a worker manager/tracker module 220 of the host server 200 of the example of FIG. 2A able to generate and store performance data for a worker.

The performance data can be determined or generated when a worker performs tasks distributed to them by a job distribution platform (e.g., hosted by the host server 200) which crowd sources tasks over a network to remote workers.

The module 220 can include, for example, a job history tracker module 225 having a session tracker 226, a job tracker 227, a worker tracker 228 having an ID tracker 229 and/or a channel tracker 230. The module 220 can further include a performance data generator 250 having a performance agent 235, a device identifier 245, a quality assessor 240, a speed tracker 255, a value assessor 260, and/or an experience level assessor 265. The performance agent 235 can further include a rejection/judgment tracker 236, a bans tracker 237, and/or a performance flagging agent 238. The quality assessor 240 can include a peer review metric module 241 and/or a gold standard metric module 242. The speed tracker 255 may further include a velocity violation detector 256. The value assessor 260 can include an FTE metric module 261 and/or a financial value metric module 262.

The worker manager/tracker module 220 can further include a worker sentiment determination engine 270, a worker preference engine 275, a static profile data aggregator 280 having a demographic information generator 281, a dynamic profile data aggregator 285, a worker profile generator 290, and/or a worker selection engine 295. The worker preference engine 275 can further include a payment preference handler 276, an objectionable content preference handler 277, and/or a work time preference handler 278. The dynamic profile data aggregator 285 can include an employment information manager 286 and/or a social network data compiler 287.

Additional or less components can be included in the host server 200 and each illustrated component.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the worker manager/tracker 220 includes a job history tracker module 225. The job history tracker module 225 can be any combination of software agents and/or hardware modules (e.g., including processors and/or memory units) able to monitor, track, determine, record, tasks, microtasks, jobs, projects that workers or contributors have worked on through the job distribution platform hosted by server 200. Job attributes, owners, details and the knowledge/expertise involved in each job/task/project can be determined, tracked, recorded for each worker or contributor performing the job and stored (e.g., in repository 132) in association with any quality or performance data for the worker.

The job history tracker module can track and store the jobs performed by workers in a given session (e.g., by the session tracker 226). For example, a worker can perform several jobs in a given work session (e.g., from the time a worker logs in to access work distributed by the job distribution platform to when the user logs out or times out, or stops working for a certain amount of time). A work session can also have a default time period duration (e.g., one day, a certain number of hours, user gets logged out of the system, a few days, etc.) as specified by the worker, job distribution platform, or a given job.

In a given work session, a worker/contributor can work on several projects or jobs, with each project or job having several tasks. The session tracker 226 can track the projects, jobs, and/or tasks that the worker has worked on in a given session and generate or compute statistics (e.g., job performance metrics) for a given project, job, or task in a given session or across multiple sessions. The statuses of the various projects, jobs, and/or tasks performed in a session can also be determined and stored. For example, the session tracker 226 can track one or more tasks that span current jobs and a history of previous jobs distributed to the worker and job performance data for the worker is collected for current and previous jobs.

Similarly, the job history tracker module can track the tasks performed by workers in a given job or across multiple jobs (e.g., by the job tracker module 227). The job tracker 227 can identify, record, and store tasks assigned to and/or performed on, worked on by the workers/contributors. The job tracker module 227 can track a history of previous jobs having tasks a worker has worked on. The statuses of various jobs and/or tasks worked on by workers/contributors can be determined and/or recorded. The worker tracker 228 can track workers that have worked in the sessions, jobs, projects, and on tasks.

In one embodiment, the worker tracker 228 assigns a unique identifier (e.g., using the ID tracker 229) to each unique worker/contributor who has worked on tasks assigned via the job distribution platform. The unique identifier can be used to identify worker profile information and/or worker performance data. The unique identifier can be assigned to the worker to be associated with the worker across various jobs and tasks. The worker manager/tracker 220 can also track a worker based on the worker pool or channel though which the worker is connected to the job distribution platform, for example, by the channel tracker 230. In some instances, a given worker may be a part of multiple worker pools and the unique worker ID can be assigned to a given worker regardless of their multiple worker pool affiliations.

The performance data generator 250 of the worker manager/tracker module 220 can be any combination of software agents and/or hardware modules (e.g., including processors and/or memory units) able to monitor, track, determine, record, job performance data over a period of time for workers/contributors performing work through the job distribution platform that crowd sources tasks to multiple workers.

In general, the job performance data can be collected when the worker performs the tasks distributed online to their respective computing devices by the job distribution platform. In one embodiment, the job performance data includes quantitative metrics which can be determined or computed by the performance agent 235 for various performance and/or quality measures. For example, the rejection and judgment tracker 236 can detect and record results submitted by a worker/contributor that were rejected as faulty or accepted as a correct result (e.g., a judgment). Managing the distribution of tasks can be performed by a task requisition system, for example, using a custom implementation of the in-memory repository or database (e.g., Redis). The repository can be optimized for ensuring redundancy and performing the corresponding de-duplication. For instance, de-duplication can be implemented such that no contributor or worker sees the same task more than a specified number (e.g., once, twice, three times, etc.). If a contributor or worker is rejected, the tasks they had previously completed can be re-routed to other contributors or workers.

In one embodiment, the job performance data includes quantitative metrics which indicate a rate or number of rejected results in performing one or more tasks or jobs, as can be determined by the rejection/judgment tracker 236. Some of the rejections and/or judgments are received as a result of test tasks distributed to workers/contributors in order to make an assessment regarding their quality of work.

In one embodiment, the job performance data includes quantitative metrics indicating a rate or number of instances of bans from the system of flags from assigned jobs, for example, by the bans or flag tracker 237. In general, a 'flagged' worker prevents the workers or contributors from continuing to work on a specific task, or set of tasks. If a worker is banned, it is generally a one time event, and prevents a worker from doing future work through the platform.

A worker/contributor may be banned from performing work through the platform or flagged from performing specific jobs or tasks when the quality or speed of the work does not meet a threshold, which can be set by the job or the job distribution platform. For example, a worker/contributor may be temporarily or permanently suspended from a job if a number of results they provided are inaccurate, or if they submit a certain number of inaccurate results in a certain amount of time, or if the worker does not complete a task within a specified time frame (e.g., by the job poster or the job distribution platform).

In one embodiment, the job performance data includes quantitative metrics indicating a rate or number of instances of the worker has been flagged for performance review hut not actually banned from a job or task, for example, by the performance flagging agent 238. Flagging can occur manually or programmatically after certain thresholds have been met. For example, flagging occurs after a peer review system has indicated a contributor is not performing accordingly or showing indicators of poor performance (e.g., spelling mistakes, irrelevant answers, or any other subjective requirements detectable by reviewers). A worker/contributor may be flagged when their performance (e.g., as indicated by one or more performance metrics of quality or speed) falls below a certain threshold, which may be set by a job requestor and/or in part or in whole determined by the job distribution platform. The rate or number of instances when the worker has been flagged for performance review can be used in assessing overall quality/performance of the worker.

In one embodiment, the performance data generator 250 tracks a rate or time with which the worker completes the one or more tasks, for example, via the speed tracker 255. The speed tracker 255 can also determine the speed, rate with which, or amount of time it takes a worker to complete a job, on average over a period of time, over a set of tasks, or over a set of jobs, for example. The rate or time with which the worker completes a task can be used as an indication in a worker profile of how efficient the worker is.

The speed tracker 255 can also track instances when the worker performs or completes a task exceeding a rate or speed, which may be an indication that a worker is not paying attention to performing the assigned tasks. As such, the job performance data can include quantitative metrics indicating a rate or number when the worker has performed or completed one or more tasks exceeding a rate or speed. In addition, the job performance data can include quantitative metrics indicating an average rate or speed with which the worker can satisfactorily complete a task, which can be used as an indicator for efficiency and/or accuracy of the worker. Each or any of the above metrics of job performance can be tracked for workers for a given job, a work session, or a number of tasks.

In one embodiment, the value assessor 260 determines the value, either quantitative or qualitative value, of work generated by workers/contributors. For example, the financial/monetary value of work generated by workers can be determined by module 262 and included as a quantitative metric of job performance data stored for a given worker/contributor. In one embodiment, the quality assessor 240 can determine the accuracy of work generated by the worker using test jobs (e.g., jobs or tasks with known responses/answers). Using test jobs/tasks with known responses/answers, the quality/accuracy of a worker's work product can directly be determined and used in computing a quantitative metric indicating the accuracy of a worker's work product. Quality assessment using test jobs/tasks can be performed by the gold standard metric module 242. In addition, the quality assessment can be performed by the peer review metric module 241, where a worker's work product can be evaluated using results generated by other workers (e.g., determine whether they match or not).

One embodiment of the performance data generator 250 includes an experience level assessor 265 which can determine an experience level of the worker based on duration or tenure with the job distribution platform. The job performance data for workers can thus include quantitative and/or qualitative metrics indicating the experience level of the worker. In addition, experience level can be determined with respect to specific types of jobs/tasks (e.g., business listing verification, content generation, adult-content detection, search result verification, etc.), or with respect to specific disciplines (e.g., art, computer science, math, language, etc.) and indicated in the job performance data of the user profile.

In one embodiment, satisfaction and/or frustration level with the job distribution platform is determined, for example, by the worker sentiment determination engine 270 to be included in the profile data. For instance, quantitative metrics indicating the satisfaction or frustration levels can be included in a worker's profile data.

In one embodiment, the profile data further includes identification of devices used by the worker to perform tasks distributed by the job distribution platform or a preference of the worker to use one or more devices to work on tasks or specific types of tasks. The devices can be identified by the worker preference engine 275, or the device identifier 245. In general, the worker preference engine 275 can determine, identify, track, record, or store the preferences of the workers. Worker preferences can be explicitly specified by the worker, determined from the worker pool or specific channel through which the worker is accessed, and/or inferred from worker behavior by the job distribution platform. Worker preferences can include an indication of a preferred time of day to perform tasks (e.g., by the work time preference handler 278), indication of willingness to perform tasks involving objectionable content or adult content (e.g., by the objectionable content preference handler 277).

Worker preferences can further include compensation preferences, which can specify preferred wage, preferred currency, and preferred type of currency and/or specify preferred payment mechanism including one or more of direct deposit, indirect deposit, or mobile credits. Compensation preferences may be determined, tracked, and/or managed by the payment preferences handler 276.

The user profile for workers can also include static profile data created or aggregated by the static profile aggregator 280. For example, demographic profile information (e.g., including, but not limited to, gender, age, ethnicity, religion, education, location, etc.) of workers can be determined, tracked, received, processed, recorded and managed by the demographic information generator 281.

The user profile can also include dynamic profile data which can be collected, aggregated, determined, detected, inferred, tracked, processed, received, stored and/or recorded by the dynamic profile data aggregator 285. For example, employment status information for workers can be determined and tracked by the employment information manager 286. Social profile data and/or professional profile data can also be aggregated for workers, for example from social network services including third party social networks and servers. Dynamical profile elements generated from historical work data can also be used. For example, the aggregator 285 can determine or track workers' historical speed, accuracy, or answer distribution and make this information queryable through the contributor profile. The aggregator 285 can also apply learning algorithms to good signals to predict future performance of a worker.

The worker profile generator 290 can use any combination of or all of the above user data including, but not limited to, quantitative and/or qualitative performance metrics for worker performance quality indicating accuracy, efficiency, knowledge, financial value, and/or expertise, worker preference (explicit or non-explicit), static or dynamic profile data (e.g., demographic information, real-life employment information, social network, presence, location information) to generate a worker profile for the worker.

The worker profile or any of the information contained therein can be used by the worker selection engine 295 in selecting a suitable worker from the repeat workers for a given task. For example, a given worker or workers can be selected to perform the new job based on worker preferences indicating willingness or unwillingness to work on objectionable or controversial content, or other criteria related to experience level, efficiency, or overall quality/accuracy.

Figure 3:
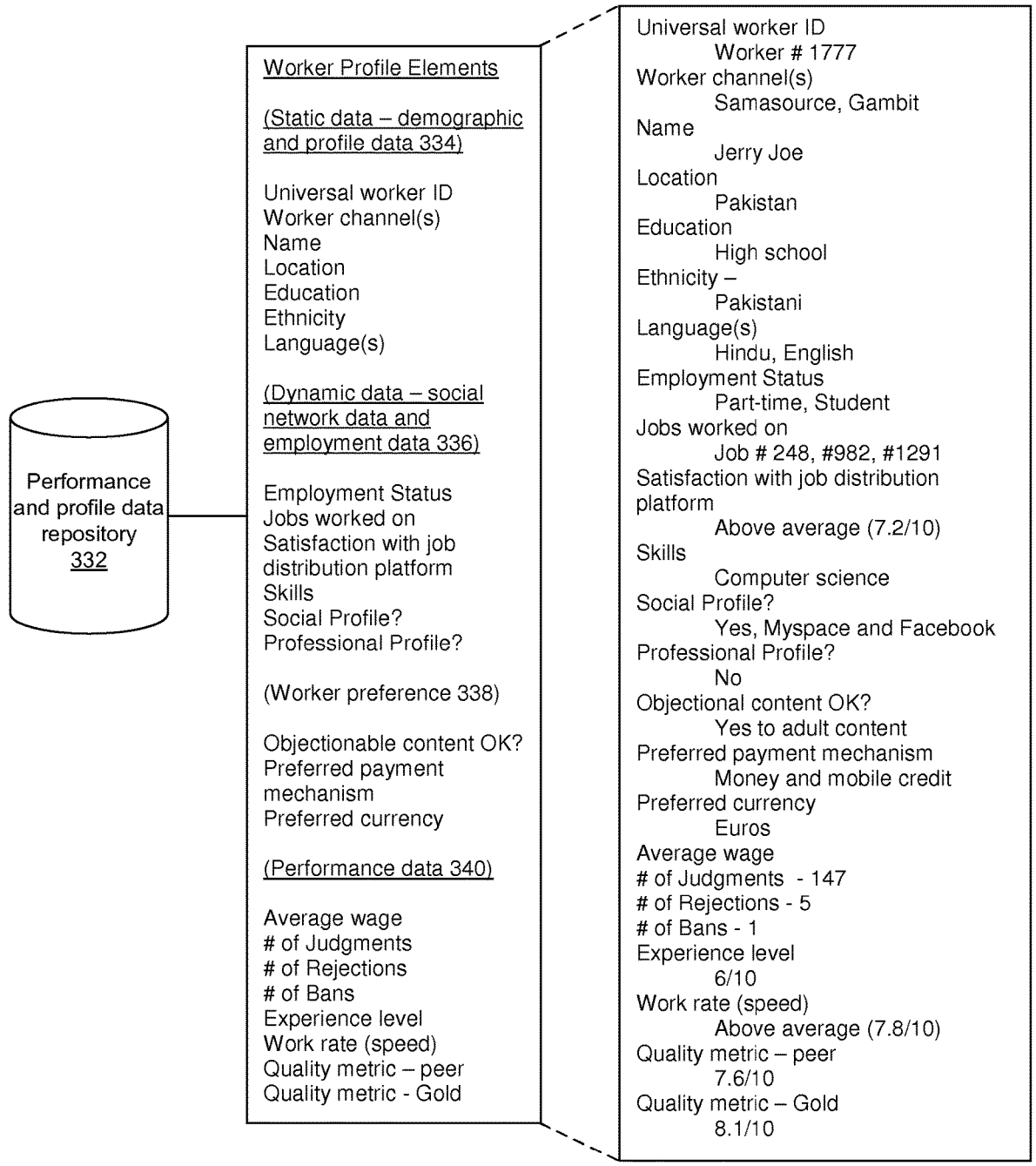
FIG. 3 illustrates an example repository for storing worker/contributor performance and profile data.

FIG. 3 illustrates an example repository 332 for storing worker/contributor performance and profile data.

The performance and profile data can include information aggregated or determined by the worker manager/tracker 220 shown in the example of FIG. 2 and the various components therein. As described in FIG. 2, the worker profile elements can include static data 334, dynamic data 336, worker preference information 338, and/or performance data 340. An example listing of each category of worker profile data is shown. Metrics for performance data can be quantitative (as shown in the example of FIG. 3) or qualitative (e.g., good, bad, average, or assigned a letter grade (P/NP, A, C, D, etc). Other types of metrics of measure can also be used.

Figure 4:
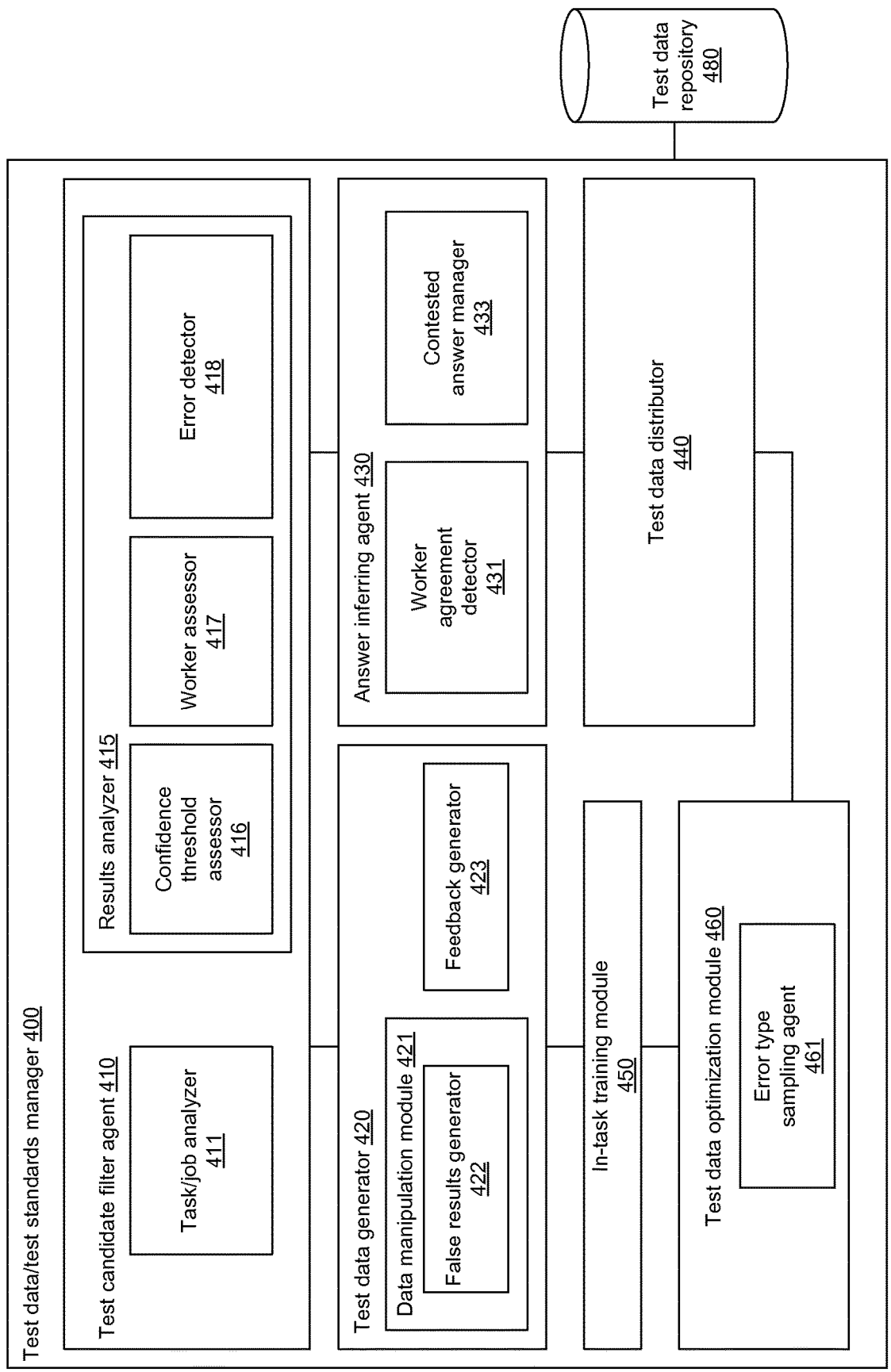
FIG. 4 depicts an example block diagram of the components of a test data/test standards manager for use in evaluating worker performing and for use in providing in-task training.

FIG. 4 depicts an example block diagram of the components of a test data/test standards manager 400 for use in evaluating worker performing and for use in providing in-task training.

The test data/test standards manager 400 can include, a test candidate filter agent 410, a test data generator 420 having a data manipulation module 421 and/or a feedback generator 423, an answer inferring agent 430 having a worker agreement detector 431 and/or a contested answer manager 433, a test data distributer 440, and an in-task training module 450, and/or a test data optimization module 460 having an error type sampling agent 461. The data manipulation module 421 may include a false results generator 422. In one embodiment, the test candidate filter agent 410 can further include a task/job analyzer 411 and/or a results analyzer 415 having a confidence threshold assessor 416, a worker assessor 417, and/or an error detector 418.

Additional or less components can be included in the test data/test standards manager 400 and each illustrated component.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The test candidate filter agent 410 can be any combination of software agents and/or hardware modules (e.g., including processors and/or memory units) able to select, identify, qualify, from jobs for distribution to workers to work on to from which generate a test or evaluation task.

In general, test or evaluation tasks are generated from actual jobs with known responses or known answers such that they can be automatically generated with no human intervention or semi-automatically generated with minimal manual editing/intervention such that the process can be efficiently scaled and deployed. Therefore, in one embodiment, the task/job analyzer 411 is able to analyze submitted jobs or tasks based on various parameters to determine suitability for use a test/evaluation task.

The parameters which can be used to determine suitability include, whether a correct response is known for a given/task job, the certainty (degree) with which a response is known to be accurate, whether a given/task job has known common worker errors, whether a response to a given task/job is subjective or objective, number of correct responses/results for a given task/job, for example. The task/job analyzer 411 can assess an actual job or task based the above parameters or additional parameters to identify those suitable for use in testing or evaluating worker competency.

In general, jobs with known responses, or responses known to be accurate to a certain threshold, can be considered as suitable for direct use or modified for use as test/evaluation tasks. For example, the results analyzer 415 can review, analyze, jobs/tasks and associated actual responses received from workers/contributors to determine whether correct data/responses are known. The results analyzer 415 can also determine whether a given task/job is associated with a single objective answer which is correct or whether the task/job may have several answers which can be correct. In general, the results analyzer 415 selects task/jobs that have a single objective answer, or a few objective answers for use as candidates or ideal candidates for creation of test jobs/evaluation tasks.

In one embodiment, the results analyzer 415 can determine the confidence with which a given response to a job/task is known to be correct. If the confidence is determined to exceed a threshold (e.g., by a confidence threshold assessor 416), the job/task and the response can be used in generation of a test or evaluation task for the benchmarking of other or new workers, for example. The confidence threshold assessor 416 can determine or estimate the confidence level based on, for example the number of same results received from workers for a given job/task. For example, through the answer inferring agent 430 coupled to the results analyzer 415. The answer inferring agent 430 can detect agreement among various workers in the responses they provided for the same task/job (e.g., via the worker agreement detector 431). Typically, a larger number of same responses provided by different workers for the same task/job correspond to a higher confidence level associated with that response which can be tracked by the confidence threshold assessor 416.

In some instances, confidence level of a response depends in part or in whole on the worker who submitted the response, and whether the worker is generally known to provide high quality work product and/or has demonstrated expertise or capabilities in certain areas, as determined by the worker assessor 417. For example, responses provided by workers of higher confidence (e.g., known to be highly competent or reliable, or known experts) can be weighed higher in determining confidence level of a response. Occasionally, multiple or a large number of workers will agree on the same-wrong result which the system may then inaccurately categorize as the correct response for a given task/job. The contested answer manager 433 provides a feedback mechanism to address this by allowing workers to contest the wrong result when working on the test task, for example, via the contested answer manager 433. In one embodiment, a given test task is removed or disabled when the contention rate for a given result of a test is exceeds or meets a threshold.

One embodiment of the results analyzer 415 includes an error detector 418 which can detect, identify, filter, determine, spot errors in responses provided by workers in performing the distributed tasks/jobs. The error detector 418 can also identify one or more common worker errors associated with a given task/job. For example, in a URL verification task, workers might have difficulty with businesses which are similarly named but are located in the wrong city. For instance, if a local search engine wanted the "Bob's Restaurant" located in Seattle, Wash., hut the URI, provided was for a "Bob's Restaurant" in Portland, Oreg., workers often have difficulty distinguishing between the two and incorrectly state the URI, is for the right business in the given city and state. As described below, it is possible to generate test tasks/jobs that directly target this type of worker error (e.g., "city/state" evaluation tasks). Since worker errors can fall into discrete sets, once these are identified, test tasks/evaluation tasks can be generated, for example, by the test data generator 420. Test tasks generated from common worker errors can also be utilized to train workers, for example, via the in-task training module 450.

Using the results of the jobs/tasks analyzed and filtered by the test candidate filter agent 410, the test data generator 420 can then use the candidate jobs, known answers, answers meeting a confidence threshold, known errors, known common errors to generate test tasks. In one embodiment, a given job/task which is associated with a known correct result (e.g., as determined from agreement among results provided from different workers or a certain number of users) can be created into a test data unit or test data pair by the test data generator 420 for use in verification by a worker. In the case that a known correct result is associated with a test job/task, the worker is to verify the accuracy of such a result for satisfactory completion of the test job/task.

In one embodiment, knowing a correct result or result meeting or exceeding a confidence threshold and is thus treated as a correct result associated with a job task, can be used to generate a test unit/data with a manipulated result, which is known to be an incorrect result for the job to generate a test task. The correct result or can be manipulated by the data manipulation module 421 to generate another result which is incorrect by the false results generator 422) to be associated with the job/task to generate a test data unit. In one embodiment, the manipulated result is determined from frequently received worker errors in response to working on the job, to target common worker errors and to provide in-task worker training on the common types of errors.

In this case, to successfully complete this test job, the worker should be able to identify the manipulated result associated with the test job to be incorrect. Specifically, the work quality of the worker is evaluated in part by determining whether the worker has identified the manipulated result as being an inaccurate result for the job.

Once the test jobs/tasks (e.g., evaluation jobs/tasks) have been generated by the test data generator 420, the test data distributor 440 presents the test tasks to workers for evaluation of worker quality, via their respective computing devices. In general, the test task(s) are presented among other (regular) jobs such that the worker is unaware of which of the jobs is being used to evaluate the work quality. The frequency with which test tasks are presented to workers can be adjusted dynamically based on worker performance, for example. In general, the better a contributor is performing against the test set, the fewer test questions are presented. One embodiment of the test data generator 420 further includes a feedback generator 423 which generates feedback messages from known incorrect results.

The feedback message can be presented to the worker evaluating the test task if the worker fails to identify the manipulated result as being inaccurate for the job and facilitate the in-task training process, for example the in-task training process performed by the in-task training module 450.

The test data optimization module 460 can review and analyze created test units/test jobs and determine/assess their efficacy. For example, test units or jobs with contested responses can be monitored, tracked, and removed, disabled, or edited as appropriate by the optimization module 460. The optimization module 460 performs the associated tasks and analysis needed for ensuring that test units/jobs provide an accurate representation of worker quality, reliability, or competency. One embodiment of the optimization module 460 includes the error type sampling agent 461. The sampling agent 461 is able to sample different types of worker errors for use in creating or optimizing test data sets/test units. Identification and sampling of different worker error types allows test data/test tasks to be generated with a uniform distribution of target errors.

Figure 5:
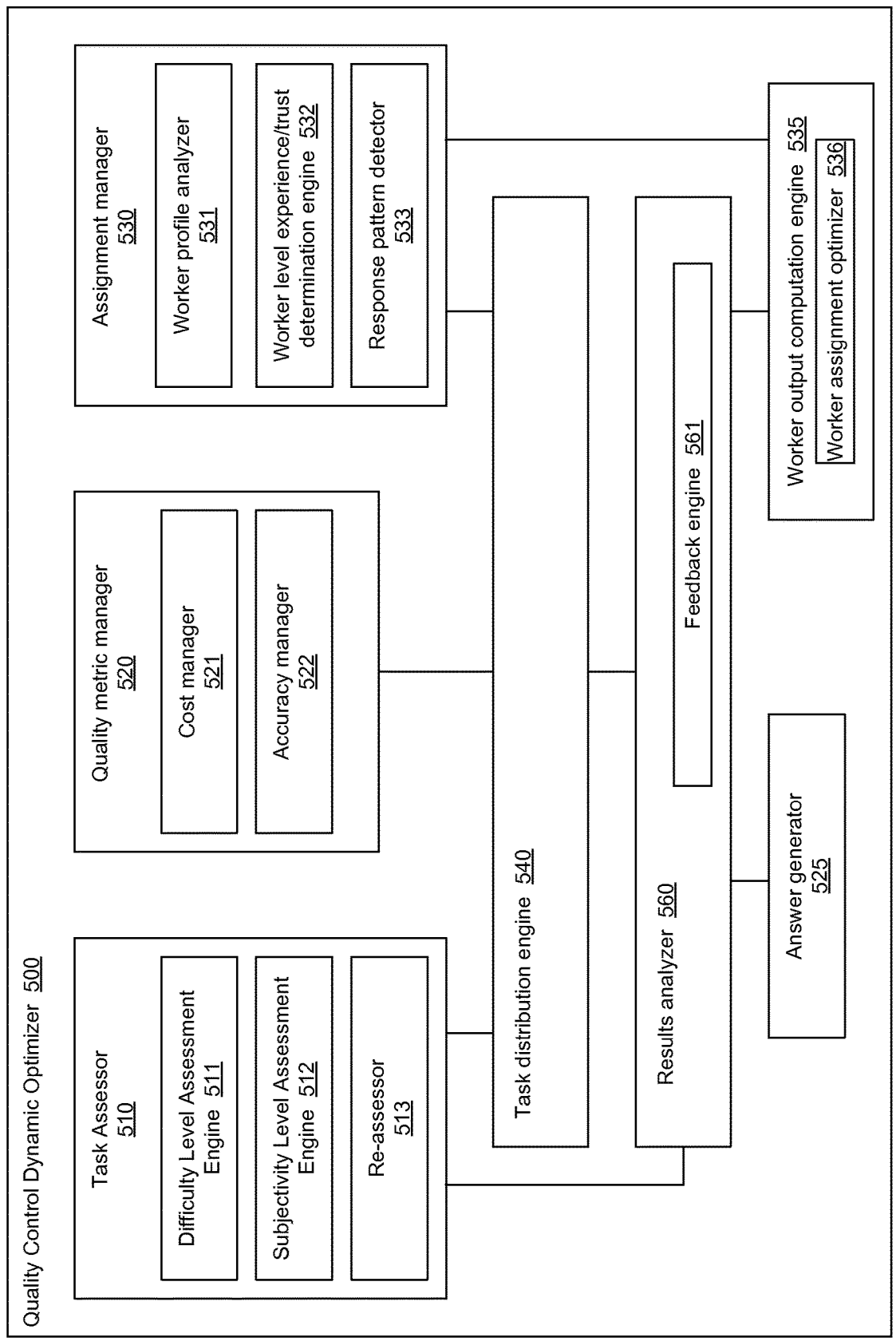
FIG. 5 depicts an example block diagram of the components of a quality control dynamic optimizer which is able to adjust and re-adjust worker assignments based on assessment of difficulty and real-time analysis of how results compare to a desired quality metric for a given job.

FIG. 5 depicts an example block diagram of the components of a quality control dynamic optimizer 500 which is able to adjust and re-adjust worker assignments based on assessment of difficulty and real-time analysis of how results compare to a desired quality metric for a given job.

The quality control dynamic optimizer 500 can include, a task assessor 510, a quality metric manager 520, an assignment manager 530, a task distribution engine 540, a results analyzer 560 having a feedback engine 561, a worker output computation engine 535 having a worker assignment optimizer 536, and/or an answer generator 525. The task assessor 510 can further include a difficulty level assessment engine 511, a subjectivity level assessment engine 512, and/or a re-assessor 513. The quality metric manager 520 can further include a cost manager 521 and/or an accuracy manager 522. The assignment manager 530 can further include a worker profile analyzer 531, a worker level/experience/trust determination engine 532, and/or a response pattern detector 533. Additional or less components can be included in the work flow generator and manager 500 and each illustrated component.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums or storage mediums include hardware (e.g., registers, buffers, random access memory (RAM), non-volatile (NV) or volatile storage, to name a few), but may or may not be limited to hardware.

The task assessor 510 can determine the difficulty of jobs or tasks submitted to a crowd sourcing service (job distribution platform) for completion. The task assessor 510 can determine or assess the difficulty (e.g., objective difficulty by the engine 511) and/or measure/assess a subjectivity level of a task or job (e.g., by the engine 512). The task assessor 510 can make the difficulty and/or subjectivity assessments by analyzing the task to determine whether answers would be readily available via the web, phone, books, or other published, print material or online material.

The assessor 510 can also analyze the task to determine how much prior knowledge/education would be needed to perform the task, for example. In some instances, a subjective task can also categorize as a difficult task. The task difficulty can also be determined or estimated in part or in whole by a comparison with prior similar tasks, based on the outcome of the prior tasks and/or based on prior worker responses. In one embodiment, the assessor 510 can assess task difficulty based on monitoring how workers are responding to the task (e.g., speed, rates of response, etc. as tracked by the response pattern detector 533), and continuously re-assess the difficulty (e.g., by the re-assessor 513) of a given job or task.

The quality metric manager 520 can generator a qualitative and/or quantitative indicator as a desired quality indication for a given job or task. In general, the quality metric depends on the budget of the client/customer and/or a desired accuracy level. In one embodiment, the quality metric manager 520 generates a quality metric which can indicate a target for a given cost constraint (e.g., as managed by the cost manager 521). In some instances, the quality metric generates a metric solely based on desired accuracy level for example, without a cost constraint. The accuracy level can be explicitly specified by a customer/client, associated with a type of account/subscription level of the customer/client, or set by default by the system for the given type of job/task, or a minimum required quality level set by the system across all tasks/jobs.

The assignment manager 530 uses the task difficulty determined by the task assessor 510 and/or the quality requirements (e.g., as indicated by a quality metric determined by manager 520) to assign one or more workers to a given task. The assignment manager 530 can assign any worker. The assignment manager 530 can also assign workers based on prior performance statistics, as may be determined by the worker profile analyzer 531.

The manager 530 can also assign workers based on their cost (e.g., a function of their compensation and/or worker channel). In addition, the manager 530 can determine the worker's level of experience/trust (e.g., by engine 532) for use in worker assignment to a given task. The assignment can be based solely on seniority with the crowd sourcing/job distribution platform. The assignment can also be based on a worker's specific types of experience with the types of task in question (e.g., whether the task is a verification-type task, whether it is a content-enhancement task, URL verification, listing verification, web-site content enhancement, or others).

The task distribution engine 540, based on the worker assignment, distributes the task to the one or more assigned workers, and also any additionally assigned workers selected as a result of the preliminary results analyzed by the results analyzer 560. For example, the results analyzer 560 can aggregate the results and generate an analysis for use in for example, re-assessing the difficulty of the task (e.g., by re-assessor 513), and or for use by the engine 535 to assess or re-assess the number of workers needed to reach the desired quality (e.g., quality metric), via the feedback engine 561.

The feedback engine 561 can feed back real time, near real time, or non real time analysis of results submitted for a given job to optimize worker assignment (e.g., via the computation engine 535) and/or to re-assess task difficulty (e.g., via the re-assessor 513) and to make the optimization adjustments as a result thereof. The engine 535 can, based on the real-time, near real time, or non real time feedback of results for a given job, determine, compute, or estimate the worker output or additional worker output needed to reach a given accuracy level, or a given accuracy level but maintaining a certain financial budget. The worker assignment optimizer 536 selects one or more additional workers to work on the task if the desired accuracy has not been met. This selection includes selecting an optimal number of workers. The selection can also include selecting specific workers based on individual performance levels and/or experience levels.

Once the desired accuracy has been met (e.g., as determined using a metric such as the quality metric) the answer generator 525 aggregates the results received from multiple workers for a given task and generates the answer. In one embodiment, the answer is the most frequently occurring response when applicable. When inapplicable, the system can assign additional workers until there is one most frequently occurred response. When a single most frequently occurring common response does not exist, the answer generator 525 can select one response as the answer to be provided based on the workers who submitted the answers. For example, if two responses are tied for must frequently occurring, the response provided by a more experienced/more trusted/higher performing worker can be selected as the answer. In the case of multiple workers, the average level of experience/level of trust can be used.

An example is provided below to illustrate one embodiment of how the optimizer 500 performs:

Given a budget for a job or tasks, the cost to spend per task can be determined. For example, if the quality metric of a given task is 0.8 and cost no more than $0.10 and workers provide the following answers:

Worker 1 with trust of 0.9 answers "A"
Worker 2 with trust of 0.7 answers "B"
Worker 3 with trust of 0.8 answers "A"

At this point the optimizer 500 would require additional results since a confidence of 0.8 has not been met. (Agreement is 66%, when weighted by the higher trusts for workers 1 and 3 the confidence would be around 75%).

Therefore, another worker is selected and answers the following:

Worker 4 with trust of 0.8 answers "A"

With this additional result, a confidence over 0.8 has not been met and no additional assignments are made for this task. In the alternative, if worker 4 had answered "B" and each result had cost 2.50, the optimizer may stop collecting results because the specified budget has been reached. The optimizer can then return an answer with a confidence of 0.6.

Figure 6:
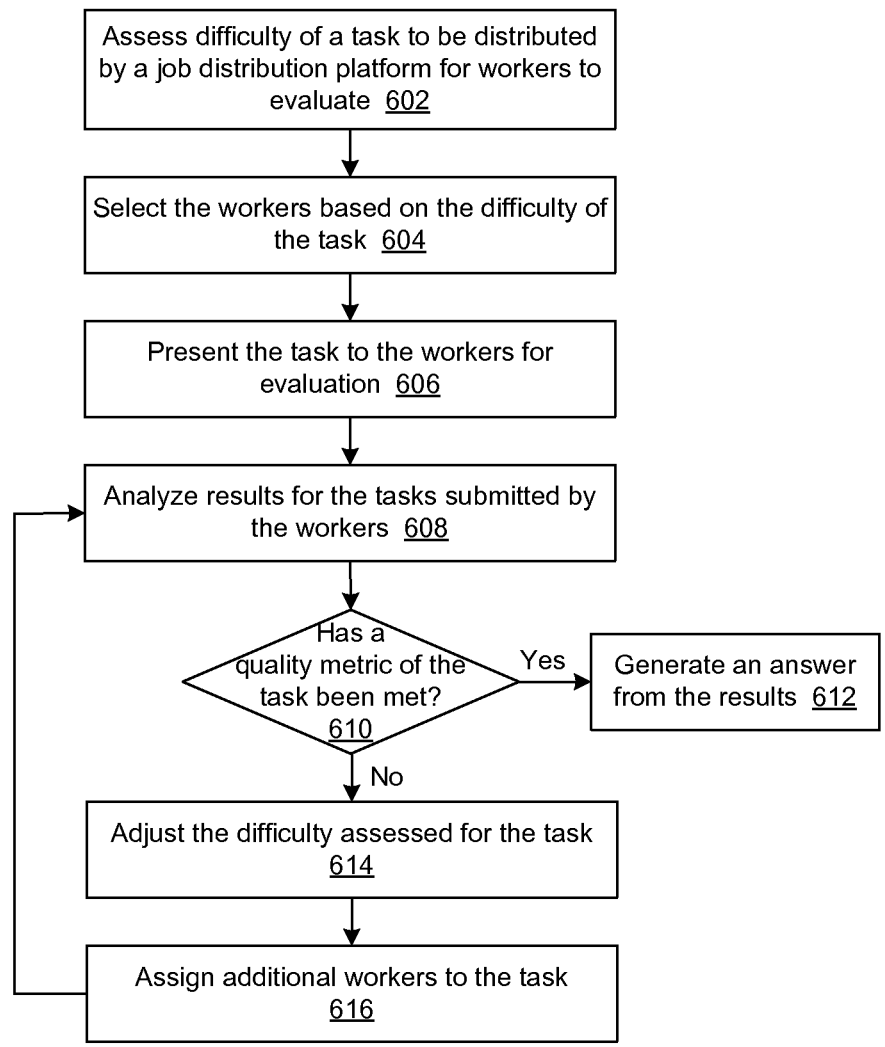
FIG. 6 depicts a flow chart illustrating an example iterative process for dynamically assigning workers to a task based real time determination of whether the accuracy has met a target quality metric for the task.

FIG. 6 depicts a flow chart illustrating an example iterative process for dynamically assigning workers to a task based real time determination of whether the accuracy has met a target quality metric for the task.

In process 602, the difficulty of a task to be distributed by a job distribution platform for workers to evaluate is assessed. The "difficulty" of a task can be a measure of how much research is needed to provide a response or how readily available the information needed to provide a response to a given task is.

The assessing the difficulty of the task can in general, include assessing a subjectivity level of the task. If a task involves a high level of subjectivity in responding, the difficulty level of the task may be higher. For example, a more subjective task involves opinions of the worker or others and less subjective tasks can include verification or identification of factual information. An example of a subjective task may be, "is the TV show "Smash" popular?" and, an example of a less subjective task may be, "Please verify the customer service number for the Holiday Inn on $12^{th}$ ave (415)-123-1222." Tasks with higher difficulty may be tasks which involve more work, for example "Please find the telephone number for all Holiday Inns in San Francisco, Calif."

In process 604, the workers are selected based on the difficulty of the task. In general, more workers are assigned or selected with increasing task difficulty. Similarly, workers with more experience or higher trust can typically be assigned to more difficult tasks.

In process 606, the task is presented to the workers for evaluation. In general, the task is presented to the workers by the crowd sourcing service or job distribution platform. The workers can access the task and perform the requested action and submit responses or results via their respective user devices (e.g., computer, portable device, smart phone, etc.).

In process 608, results for the tasks submitted by the workers are analyzed. The results can be analyzed by comparing the results with one another and determining consistency among individual results submitted by each of the workers In process 610, it is determined whether a quality metric of the task been met. If the quality metric has been met, in process 612, an answer is generated from the results. In general, the "quality metric" is any quantitative and/or qualitative indicator/representation of how accurate the results or responses for a given task are. For example, if the results/responses received for a given task are all or mostly the same among different workers, than the most frequently occurring result/response is likely the right answer, with a high confidence/trust level. In addition, results/responses received from a more trusted worker, if different from a less trusted worker for the same task, is more likely the right answer. As such, the quality metric of a given result can depend on consistency between different workers, as well as the trust level of the workers who provided the result/response.

Figure 7:
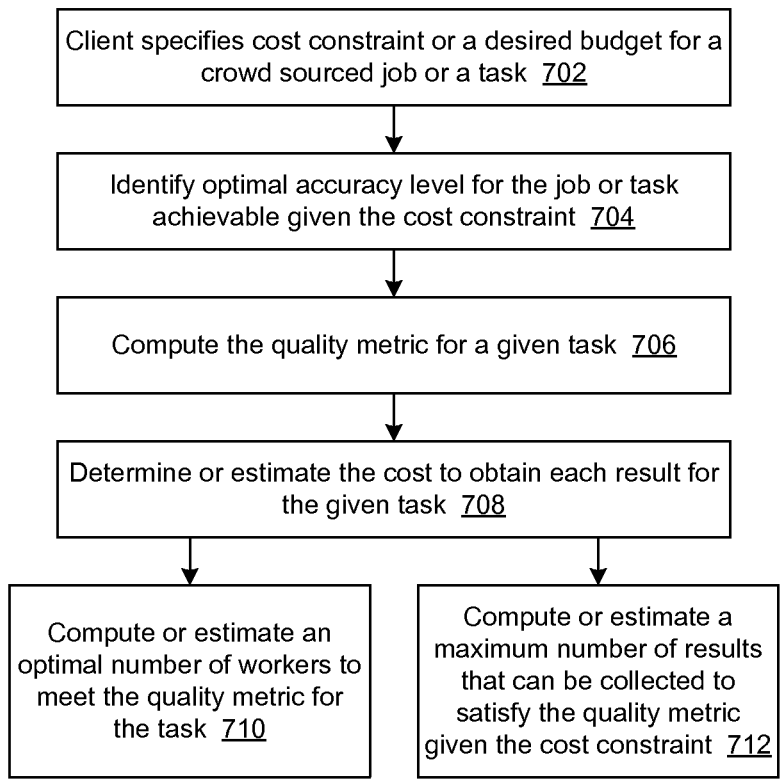
FIG. 7 depicts a flow chart illustrating example processes for estimating or computing number of results and number of workers to meet the quality metric for a given task given a cost constraint.

In one embodiment, the quality metric can also include a cost metric in addition to the accuracy metric. For example, the quality metric can be determined by identifying optimal accuracy level achievable given a cost constraint. FIG. 7 further illustrates example steps for determining a quality metric and using the quality metric for determining optimal number of workers/results for a given task to meet budget and quality requirements.

If the quality metric is yet to be met, in process 614, the difficulty assessed for the task can be adjusted. In process 616, additional workers to the task are assigned to the task and the flow continues to process 608 where the additional results thus obtained are analyzed. The flow can continue until the quality metric has been met.

The number of the additional workers that are assigned can be determined based on level of experience or performance of the additional workers. The number of the additional workers can also be determined based on the adjusted difficulty assessed/re-assessed for the task. In one embodiment, the number of additional workers is determined in bulk or determined on an as-needed basis and/or re-adjusted as new results are obtained from workers.

In one embodiment, the workers are selected based on experience or trust level and the number of additional workers needed/assigned can be based on the individual trust levels of the workers. In one embodiment, the number of workers to select to evaluate the task is determined or estimated such that the quality metric can be met. In general, the workers can be selected based on worker profile and history information aggregated also by the job distribution platform, when the workers worked on other tasks distributed through the job distribution platform In one embodiment, when the quality metric has yet to be met, at least one additional worker can be assigned and additional results submitted by the at least one additional worker is analyzed to re-assess whether the quality metric has been met, each time one of the additional results is received. The system further assigns workers and collects results until the quality metric has been met. Any time the result causes the quality metric to be met, the system stops assigning additional workers to the task. This allows a cost saving benefit since just the right amount of results are used to achieve a desired quality level since the system ceases to incur additional cost once the quality metric is met.

In one embodiment, further assigning workers and collecting results until a cost constraint has been reached, even if the quality metric has not been met. For instance, in the event that the number of workers utilized exceeds a specified cost constrained or budget, and the results have yet to meet a quality metric (e.g., there is insufficient consistency or not enough workers have submitted consistent results), further results are not collected from additional workers to ensure that the budget is met. In this case, an answer is generated and a confidence level for the answer may be returned to the client/customer.

FIG. 7 depicts a flow chart illustrating example processes for estimating or computing number of results and number of workers to meet the quality metric for a given task given a cost constraint.

In process 702, a client can specify cost constraint or a desired budget for a crowd sourced job or a task directly or indirectly. For example, the client may specify an overall budget for several jobs and the crowd sourcing platform determines the budget that can be allocated to individual jobs and/or tasks. In some instances, the budget/cost is automatically determined by the subscription level of the client/customer, for example.

In process 704, optimal accuracy level for the job or task achievable given the cost constraint is identified. In general, the "optimal" accuracy level is the highest accuracy level given a specified budget. The highest accuracy level can be determined for a select or fixed given set of workers, using their confidence level. The accuracy level can also be determined, in one embodiment, on the fly as results are submitted by workers.

In process 706, the quality metric for a given task is computed.

In process 708, the cost to obtain each result for the given task is either determined or estimated. The cost for a result can be determined from the workers assigned to the task and/or the channel used to reach the workers. In general, the cost is determined from the worker's compensation and the number of workers used, and/or the number of workers needed. The cost may also be determined based on the workers' confidence or trust values, for example.

In process 710, an optimal number of workers (or results) needed to meet the quality metric for the task is computed or estimated.

Figure 8:
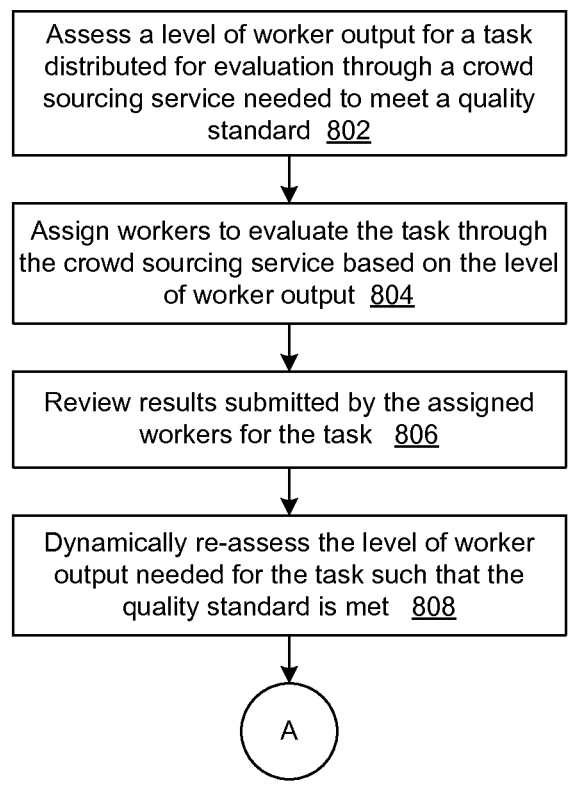
FIGS. 8-9 depict example flows for dynamically updating task difficulty and worker assignment based on worker performance and response, which can be determined on the fly.
Figure 9:
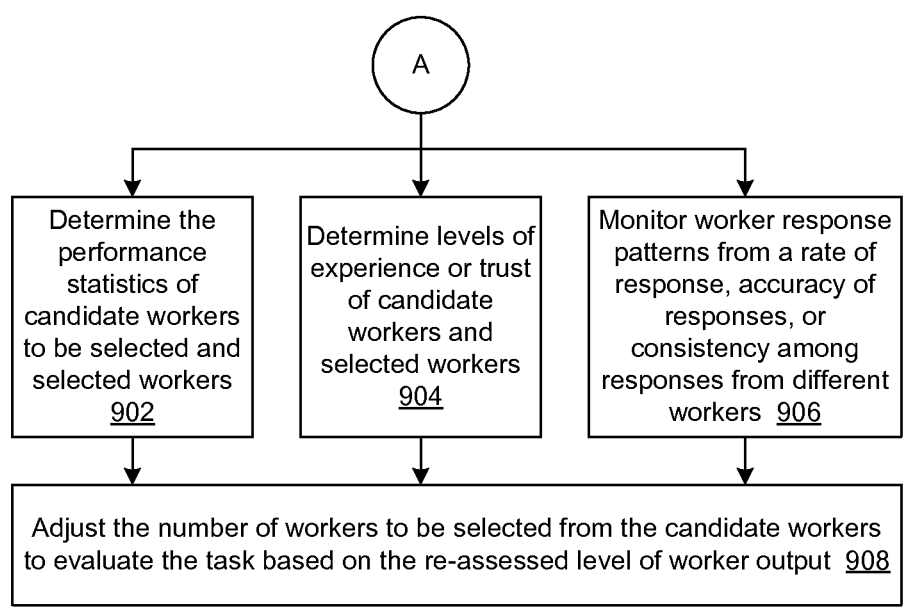

In process 712, a maximum number of results that can be collected to satisfy the quality metric is computed or estimated given the cost constraint. The optimal number of results can be determined using the cost to obtain each result, for example, the cost to obtain each result can be determined from the compensation of each of the assigned workers from whom a result is to be collected FIGS. 8-9 depict example flows for dynamically updating task difficulty and worker assignment based on worker performance and response, which can be determined on the fly.

In process 802, a level of worker output for a task distributed for evaluation through a crowd sourcing service to meet a quality standard. For example, the level of worker output can be assessed from difficulty and/or subjectivity level of the task. Generally, the more difficult a task is and/or the more subjective a task is, a higher level of worker output is needed for a given task.

In process 804, workers are assigned to evaluate the task through the crowd sourcing service based on the level of worker output. In general, "worker output" can include quantitative and/or qualitative factors which depend on a number of workers needed and the levels of experience or trust of each worker or of an average worker in a selected group.

In process 806, the results submitted by the assigned workers for the task are reviewed. In process 808, the level of worker output needed for the task such that the quality standard is met is dynamically re-assessed. The flow continues to Flow 'A' in FIG. 9.

In process 902, the performance statistics of candidate workers to be selected and selected workers are determined. In one embodiment, the performance statistics are determined from a worker profile for the worker including an aggregate indication of job performance and competency. For example, the performance statistics can be computed by the crowd sourcing service based on the worker's job performance via the crowd sourcing service, or computed by other services.

In process 904, levels of experience or trust of candidate workers and selected workers are determined. The levels of experience or trust can be based on on prior worker performance in the given job distribution platform which dynamically optimizes worker assignment for data quality control. In process 906, worker response patterns are monitored from, one or more of a rate of response, accuracy of responses, or consistency among responses from different workers. In process 908, the number of workers to be selected from the candidate workers is adjusted to evaluate the task based on the re-assessed level of worker output, and further using any or all information obtained in steps 902, 904, and 906.

Figure 10:
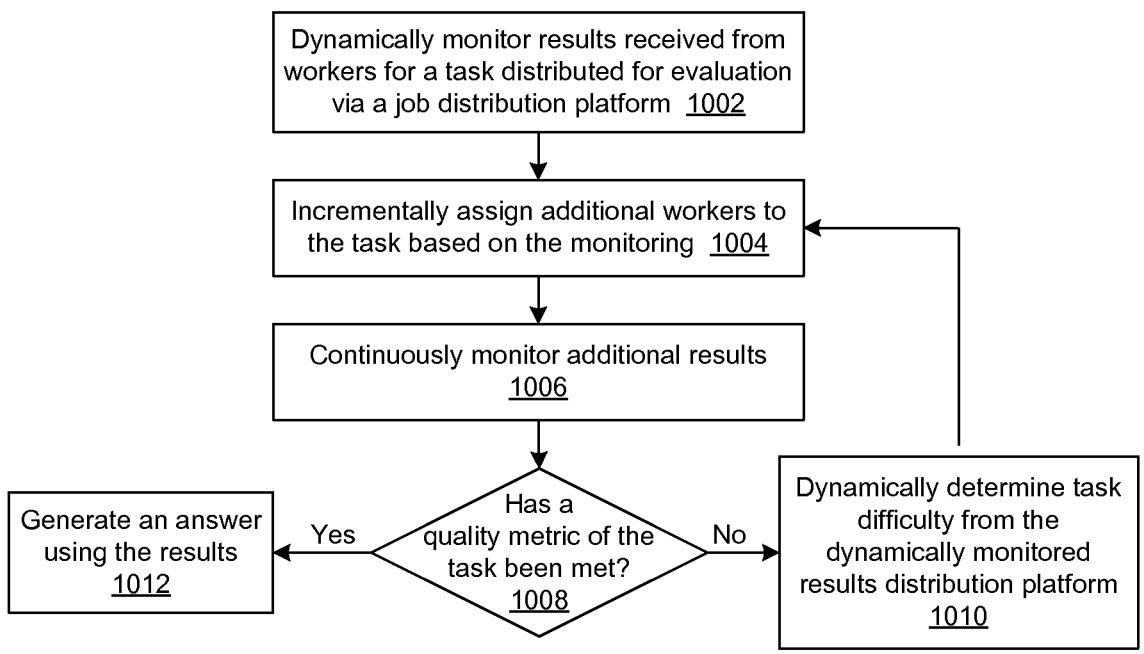
FIG. 10 depicts a flow chart illustrating an example process for iteratively assigning additional workers to a task on an as-needed basis to achieve the quality metric, and also optionally re-assessing task difficulty on the fly.

FIG. 10 depicts a flow chart illustrating an example process for iteratively assigning additional workers to a task on an as-needed basis to achieve the quality metric, and also optionally re-assessing task difficulty on the fly.

In process 1002, results received from workers for a task distributed for evaluation via a job distribution platform are dynamically monitored.

In process 1004, additional workers are incrementally assigned to the task based on the monitoring. In one embodiment, a number of the additional workers that are incrementally assigned depend on performance statistics of the additional workers and/or difficulty of the task. In process 1006, additional results are continuously monitored. The difficulty of the task can be dynamically determined from the dynamically monitored results. For example, task difficulty can be re-evaluated each time a new result is received, or after a certain number of results are received. In one embodiment, the difficulty of the task can be dynamically determined from monitoring response patterns of the workers in submitting the results.

In process 1008, it is determined whether a quality metric of the task been met. The quality metric can be determined to optimize accuracy based on a cost constraint associated with assigning more workers to the task.

In process 1010, if not, task difficulty can be dynamically determined from the dynamically monitored results distribution platform and the flow can continue back to step 1004 where additional workers are assigned to evaluate the task. If and when the quality metric of the task has been met, in process 1012, an answer is generated using the results. For example, if all of the results/responses are the same, the answer is simply the result provided by all workers. If some inconsistency is present, the answer may be the most frequently occurring common result among all results provided by all workers.

In addition, the answer that is selected from the results can also depend on trust or experience level of the specific user who submitted the response/answer. For example, if only two different results were obtained, the result that is submitted by a more trusted/experienced worker is more likely to be the selected answer. Generally, the answer is selected based on a combination of frequency of occurrence of results and if there is a dominant response (most frequently occurring), and trust/experience level of workers who submitted the responses.

Figure 11:
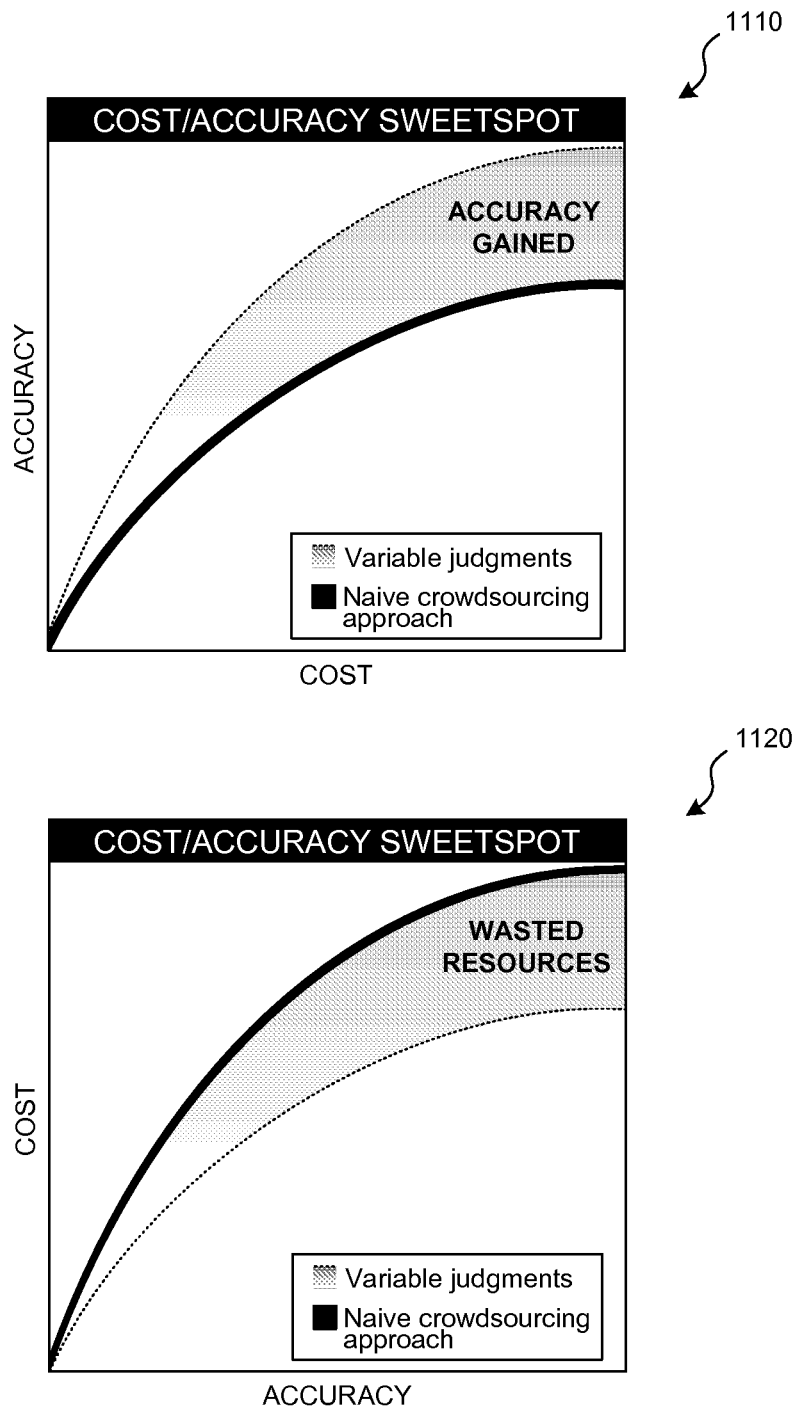
FIG. 11 depicts plots showing the cost and accuracy benefits in crowd sourcing tasks achieved through dynamically optimizing worker assignment for quality control.

FIG. 11 depicts plots 1110 and 1120 showing the cost and accuracy benefits in crowd sourcing tasks achieved through dynamically optimizing worker assignment for quality control. Plot 1110 illustrates how by dynamically adjusting how many results are obtained and which workers are assigned to generate those results, additional accuracy can be obtained for a fixed budget/cost level over other techniques whereby dynamic optimization is not performed. Plot 1120 illustrates the decrease in wasted resources (human resource and/or financial resource) needed to achieve a certain accuracy level. For example, the described dynamic optimization technique allows use of just the right amount of workers to achieve a desired accuracy since each additional worker can be iteratively assigned, only if the desired accuracy has been met.

Figure 12:
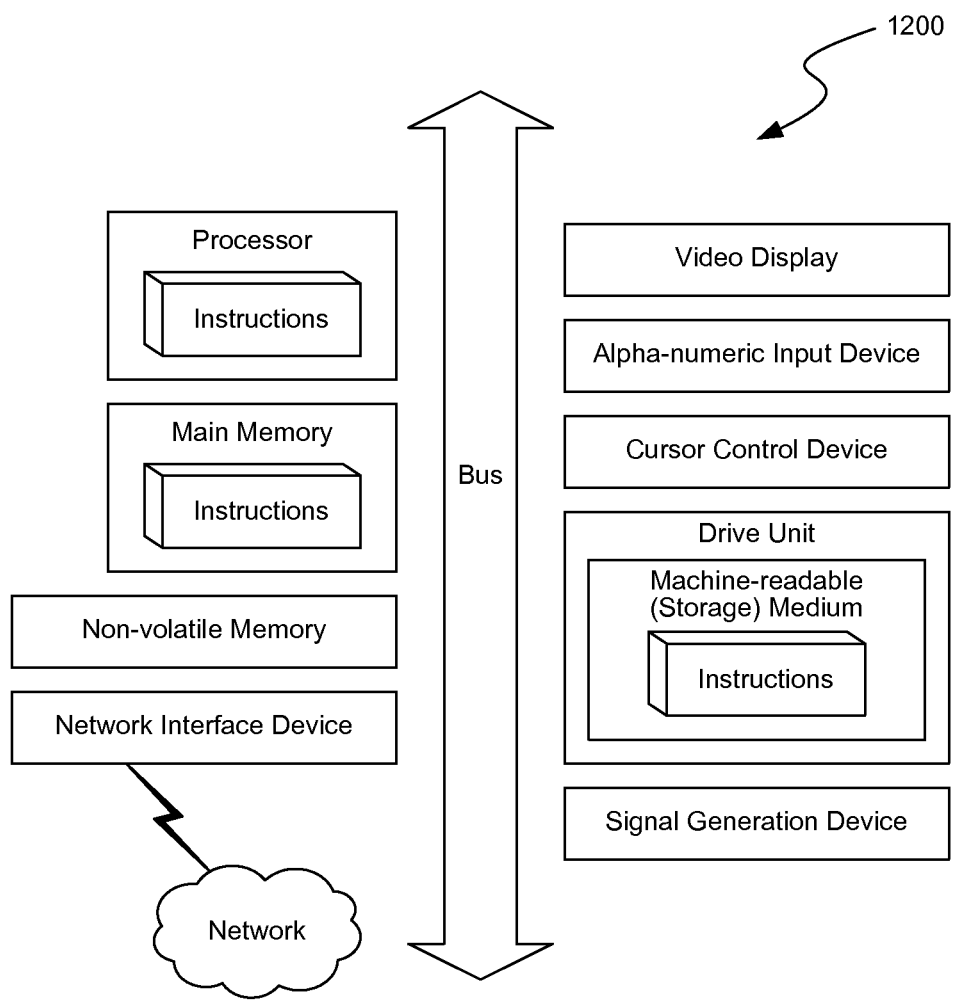
FIG. 12 shows a diagrammatic representation of a machine in the example form of a computer system within which a set of instructions, for causing the machine to perform any one or more of the methodologies discussed herein, may be executed.

FIG. 12 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1100 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc, without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, white still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A computer-implemented method comprising:
   determining, by a computer, a difficulty of a task to be distributed by a job distribution platform by processing a number of identified features of the task;
   retrieving a set of characteristics relating to a plurality of workers associated with a plurality of worker devices on multiple disparate web-based platforms connected via a computing network, the set of characteristics for each worker including:
   an experience value indicative of a number of previous responses provided by each worker, and
   an accuracy value indicative of a derived similarity between each previous response provided by each worker and a determined correct response;
   selecting, by the computer, a subset of the plurality of workers across the multiple disparate web-based platforms to perform the task based on the determined difficulty of the task, wherein,
   a number of workers in the subset of the plurality of workers increases with the difficulty of the task,
   a plurality of experience values associated with the subset of workers increases with the difficulty of the task, a plurality of trust values associated with the subset of workers increases with the difficulty of the task, and
   the subset of workers are selected based on the experience value and accuracy value of each worker of the plurality of workers;
   transmitting, by a network interface over the computing network, a plurality of requests to perform the task to the multiple disparate web-based platforms, the multiple disparate web-based platforms configured to relay a request of the plurality of requests to perform the task to worker devices of each of the subset of workers, the request displayed on a user interface of each of the worker devices;
   receiving, at the network interface over the computing network, a series of results from the multiple disparate web-based platforms, the series of results derived from inputs to the user interface of each of the worker devices;
   processing, by the computer, each of the series of results to generate a quality metric for the task, wherein the quality metric is based on a determined similarity of each result to other results in the series of results,
   wherein said processing the series of results comprises:
   determining an accuracy level for one or more of the series of results;
   determining, by the computer, that the quality metric has not exceeded a threshold;
   in response to determining that the quality metric has not met the threshold:
   adjusting, by the computer, the difficulty of the task to an updated difficulty;
   determining a level of experience of a second subset of workers in the plurality of workers in relation to completing the task in accordance with the updated difficulty; and
   selecting, by the computer, the second subset of workers in the plurality of workers based on the updated difficulty and the level of experience of the second subset of workers, wherein selecting the second subset of workers includes:
   identifying workers with experience values in the set of characteristics that is increased with the updated difficulty of the task,
   identifying workers with accuracy values in the set of characteristics that is increased with the updated difficulty of the task; and
   analyzing, by the computer, a series of additional results transmitted by the second subset of workers to re-assess whether the quality metric has met the threshold.

2. A computer-implemented method of claim 1, further comprising:
   further assigning, by the computer, workers and collecting, by the computer, results until the quality metric has been met.

3. The computer-implemented method of claim 1, further comprising:
   further assigning, by the computer, workers and collecting, by the computer, further results until a cost constraint has been reached, even if the quality metric has not been met.

4. The computer-implemented method of claim 1, further comprising, generating, by the computer, an answer from the series of additional results if the quality metric is met.

5. The computer-implemented method of claim 1, wherein, the selecting the plurality of workers includes selecting the plurality of workers based on worker profile and history information aggregated also by the job distribution platform, when the plurality of workers worked on other tasks distributed through the job distribution platform.

6. The computer-implemented method of claim 1, wherein, assessing the difficulty of the task includes assessing a subjectivity level of the task.

7. The computer-implemented method of claim 1, wherein, analyzing results for the tasks submitted by the plurality of workers further comprises comparing the results with one another and determining consistency among individual results submitted by each of the plurality of workers.

8. The computer-implemented method of claim 1, wherein, the quality metric includes a cost metric and an accuracy metric.

9. The computer-implemented method of claim 1, further comprising, determining, by the computer, the quality metric by identifying optimal accuracy level achievable given a cost constraint.

10. The computer-implemented method of claim 1, further comprising, computing an optimal number of workers to meet the quality metric.

11. The computer-implemented method of claim 1, further comprising, computing an optimal number of results to meet the quality metric.

12. The computer-implemented method of claim 11, wherein, the optimal number of results is determined using a cost to obtain each result, wherein, the cost to obtain each result is determined from a compensation of each of the plurality of workers from whom a result is to be collected.

13. The computer-implemented method of claim 1, wherein, the quality metric is determined from a cost constraint specified by a client or customer of the job distribution platform.

14. A computer system comprising:
    a processor;
    a memory comprising instructions, the instructions, in conjunction with the processor configured to cause the computer system to:
    assess a difficulty of a task to be distributed by a job distribution platform by processing a number of identified features of the task;
    retrieve a set of characteristics relating to a plurality of workers associated with a plurality of worker devices on multiple disparate web-based platforms connected via a computing network, the set of characteristics for each worker including:
an experience value indicative of a number of previous responses provided by each worker;
an accuracy value indicative of a derived similarity between each previous response provided by each worker and a determined correct response;
select a subset of the plurality of workers across the multiple disparate web-based platforms to perform the task based on the difficulty of the task by inspecting the set of characteristics of the plurality of workers, wherein,
a number of workers in the selected subset of the plurality of workers increases with the difficulty of the task,
a plurality of experience values in the set of characteristics associated with the selected subset of the plurality of workers increases with the difficulty of the task,
a plurality of trust values in the set of characteristics associated with the selected subset of the plurality of workers increases with the difficulty of the task;
transmit, by a network interface over the computing network, a plurality of requests to perform the task to the multiple disparate web-based platforms, the multiple disparate web-based platforms configured to relay a request of the plurality of requests to perform the task to worker devices of each of the subset of the plurality of workers, wherein the request is displayed on a user interface of each of the worker devices;
receive, at the network interface over the computing network, a series of results from the multiple disparate web-based platforms, the series of results derived from inputs to the user interface of each of the worker devices;
analyze the series of results from the worker devices to determine whether a quality metric for the task is met;
wherein analyzing the results comprises:
determine an accuracy level for one or more of the results from the worker devices;
determine whether the quality metric has not been met;
in response to determining that the quality metric has not been met:
adjust the difficulty of the task;
determine a level of experience of additional workers in relation to completing the task in accordance with the adjusted difficulty; and
select the additional workers based on the adjusted difficulty and the level of experience, wherein
the experience value in the set of characteristics associated with the selected additional workers increases with the adjusted difficulty of the task, and
the accuracy value in the set of characteristic associated with the selected additional workers increases with the adjusted difficulty of the task;
distribute information relating to the task to the additional workers via the job distribution platform;
receive additional results to the task from the additional workers;
analyze the additional results submitted by the additional workers to re-assess whether the quality metric has been met; and
update the set of characteristics of the plurality of workers based on responses from the plurality of workers and the additional workers.

15. The computer system of claim 14, further comprising, determining an additional number of workers to evaluate the task based on the adjusted difficulty of the task.

16. The computer system of claim 15, wherein, the difficulty of the task is dynamically determined from dynamically monitored results.

17. The computer system of claim 15, wherein, the difficulty of the task is dynamically determined from monitoring response patterns of the plurality of workers in submitting the series of results.

18. The computer system of claim 15, further comprising, means for, determining the quality metric to optimize accuracy based on a cost constraint associated with assigning more workers to the task.

19. A computer-implemented method comprising:
determining an initial difficulty level of a task to be distributed by a job distribution platform by processing a number of identified features of the task;
retrieving a set of characteristics relating to a plurality of workers associated with a plurality of worker devices on multiple disparate web-based platforms connected via a computing network, the set of characteristics for each worker including:
an experience value indicative of a number of previous responses provided by each worker, and
an accuracy value indicative of a derived similarity between each previous response provided by each worker and a determined correct response;
selecting a subset of the plurality of workers across the multiple disparate web-based platforms to perform the task based on the determined difficulty level of the task, wherein:
a number of workers in the subset of the plurality of workers corresponds to the determined difficulty level of the task, and
the subset of workers are selected based on the experience value and accuracy values that correspond to the determined difficulty level of the task;
transmitting, by a network interface over the computing network, a plurality of requests to the multiple disparate web-based platforms, the multiple disparate web-based platforms configured to relay a request of the plurality of requests to perform the task to worker devices of each of the subset of workers, wherein the request is displayed on a user interface of each of the worker devices;
receiving, at the network interface, a series of responses to the task from the multiple disparate web-based platforms, the series of results derived from inputs to the user interface of each of the worker devices;
processing each of the series of responses to generate a quality metric corresponding to a similarity of each result in the series of responses;
determining whether the quality metric has not met a threshold;
in response to determining that the quality metric has not met the threshold:
adjusting the initial difficulty level of the task to an updated difficulty level based on the quality metric;
selecting a second subset of the plurality of workers based on the updated difficulty level of the task, wherein:
a number of workers in the second subset of workers corresponds to the updated difficulty level of the task, and
the second subset of workers are selected based on the experience value and accuracy values that correspond to the updated difficulty level of the task;
distributing information relating to the task to the second subset of workers via the job distribution platform;

receiving a second series of responses to the task from the subset of workers;

analyzing, by the computer, the second series of responses transmitted by the second subset of workers to determine whether an updated quality metric has met the threshold; and updating the set of characteristics of the plurality of workers based on the received responses from the subset of workers and second subset of workers.

20. The computer-implemented method of claim 1, further comprising:

populating, in a database, the plurality of requests, the number of the plurality of requests based on the number of workers in the subset of workers;

performing data deduplication to delete requests of the plurality of requests from the database based on a threshold number associated with each worker of the subset of workers; and modifying the subset of workers based on the deleted requests.

* * * * *